(12) United States Patent    (10) Patent No.: US 8,392,849 B2
Jung    (45) Date of Patent: Mar. 5, 2013

(54) MOBILE TERMINAL AND METHOD OF COMBINING CONTENTS

(75) Inventor: Joo-Young Jung, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 594 days.

(21) Appl. No.: 12/482,274

(22) Filed: Jun. 10, 2009

(65) Prior Publication Data
US 2010/0058182 A1    Mar. 4, 2010

(30) Foreign Application Priority Data

Sep. 2, 2008 (KR) .................. 10-2008-0086489

(51) Int. Cl.
G06F 3/048    (2006.01)
G06F 3/01    (2006.01)

(52) U.S. Cl. ........ 715/837; 715/788; 715/790; 715/799; 715/810; 715/835; 715/838

(58) Field of Classification Search .................. 715/736, 715/740, 779, 799, 835, 837, 838, 788, 790, 715/810
See application file for complete search history.

(56) References Cited

U.S. PATENT DOCUMENTS

| | | | | |
|---|---|---|---|---|
| 6,031,532 A * | 2/2000 | Gourdol et al. | ............... | 715/837 |
| 6,750,803 B2 | 6/2004 | Yates et al. | | |
| 7,526,482 B2 * | 4/2009 | Edwards et al. | ............... | 1/1 |
| 7,725,832 B2 * | 5/2010 | Cadiz et al. | ............... | 715/736 |
| 7,770,120 B2 * | 8/2010 | Baudisch | ............... | 715/740 |
| 2002/0186257 A1 * | 12/2002 | Cadiz et al. | ............... | 345/838 |
| 2003/0064757 A1 * | 4/2003 | Yamadera et al. | ............... | 455/566 |
| 2006/0179415 A1 * | 8/2006 | Cadiz et al. | ............... | 715/838 |
| 2007/0118794 A1 * | 5/2007 | Hollander et al. | ............... | 715/512 |
| 2009/0193363 A1 * | 7/2009 | Atherton | ............... | 715/835 |
| 2009/0319951 A1 * | 12/2009 | Benedetti et al. | ............... | 715/837 |

FOREIGN PATENT DOCUMENTS

| | | |
|---|---|---|
| JP | 2006-033605 | 2/2006 |
| KR | 1020040072109 | 8/2004 |
| KR | 1020060009712 | 2/2006 |
| KR | 10-2006-0079071 | 7/2006 |
| KR | 1020080061708 | 7/2008 |
| KR | 1020080061713 | 7/2008 |
| KR | 1020080071316 | 8/2008 |
| KR | 1020080072772 | 8/2008 |

* cited by examiner

Primary Examiner — Nicholas Augustine
(74) Attorney, Agent, or Firm — Lee, Hong, Degerman, Kang & Waimey

(57) ABSTRACT

A mobile terminal and method for combing contents is provided. The mobile terminal includes a memory, a display configured to display a plurality of icons, each icon representing separate content stored in the memory, an input unit configured to sense a user touch input, and a controller configured to select at least two of the plurality of icons in response to the user touch input causing the at least two of the plurality of icons to be at least partially overlapped, and to combine the content represented by the at least two of the plurality of icons according to a specified order to generate a new icon representing the combined contents.

15 Claims, 29 Drawing Sheets

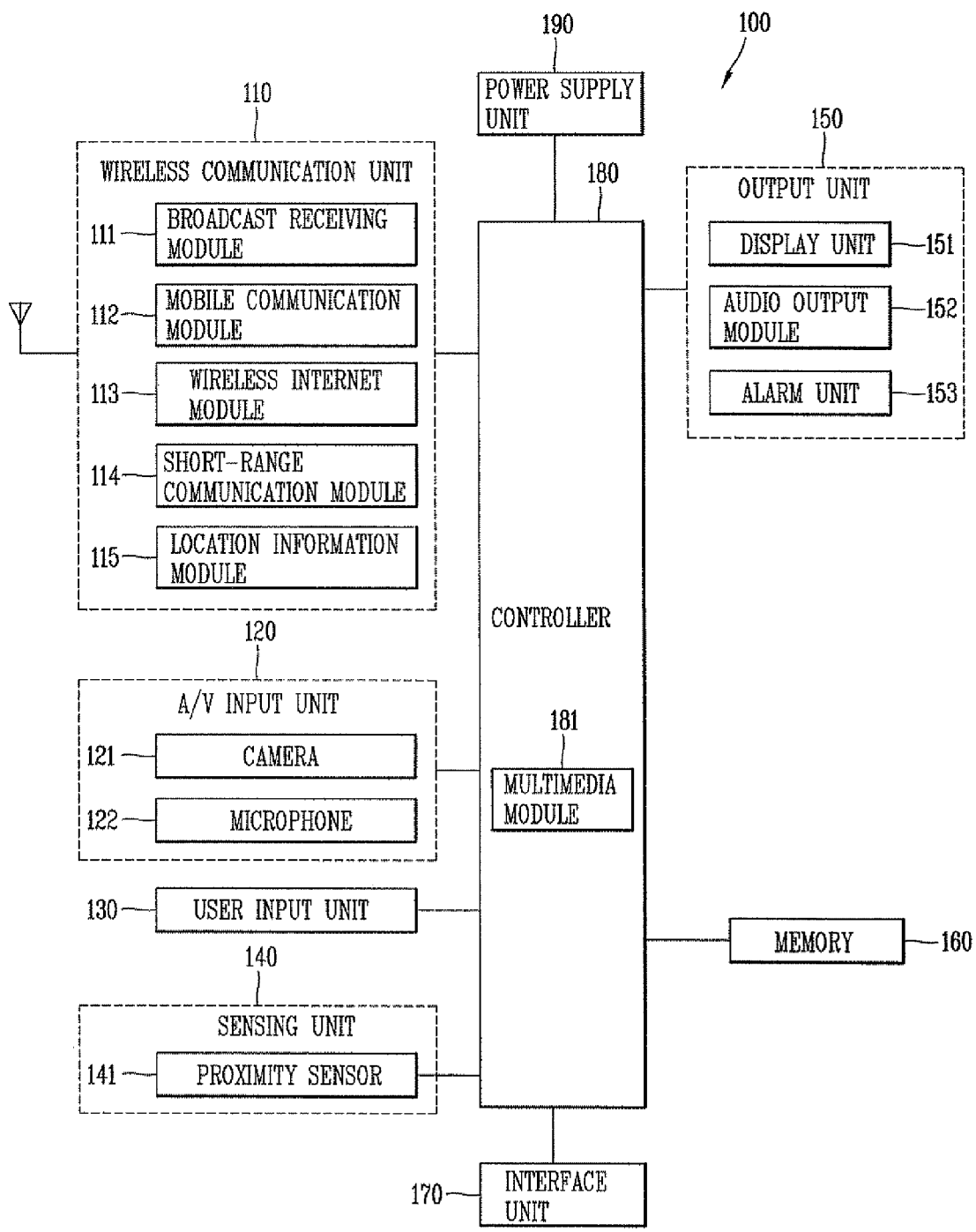

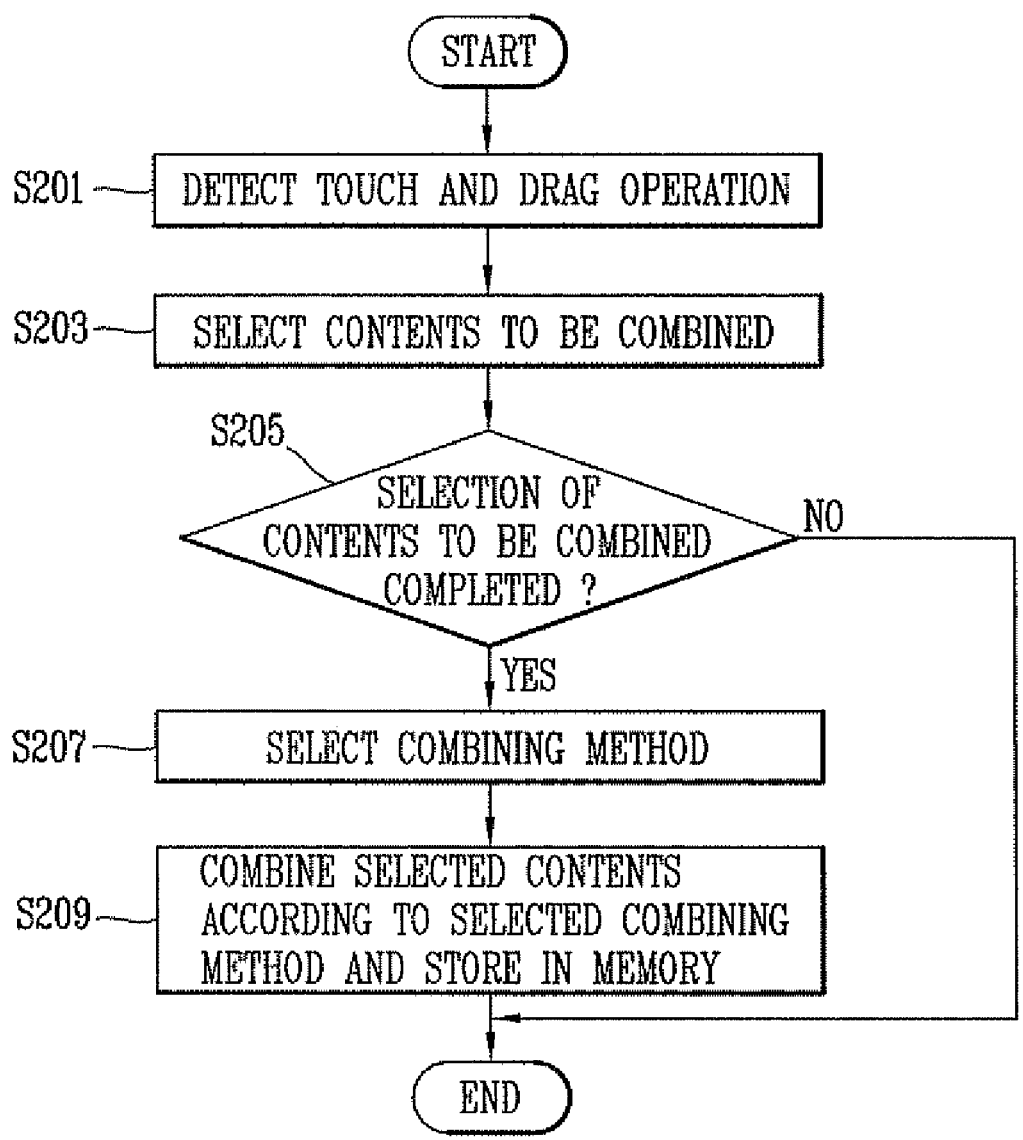

MOBILE TERMINAL AND METHOD OF COMBINING CONTENTS

CROSS-REFERENCE TO RELATED APPLICATIONS

Pursuant to 35 U.S.C. §119(a), this application claims the benefit of earlier filing date and right of priority to Korean Patent Application No. 10-2008-0086489, filed on Sep. 2, 2008, the contents of which are incorporated by reference herein in their entirety.

FIELD OF THE INVENTION

The present invention relates to a mobile terminal and a method of combining contents, and more particularly, to a mobile terminal and a method of combining contents using icons.

DESCRIPTION OF THE RELATED ART

A mobile terminal such as a personal computer, a notebook computer, or a mobile phone can be configured to perform diverse functions. Examples of such functions include data and voice communications, capturing images and video via a camera, recording audio, playing music files via a speaker system, and displaying images and video on a display.

Some terminals include additional functionality, such as support for gaming, while other terminals are configured as multimedia players. More recently, mobile terminals have been configured to receive broadcast and multicast signals which permit viewing of content, such as videos and television programs.

In general, a terminal is categorized as a mobile terminal or a stationary terminal depending on whether the terminal is portable. Moreover, a mobile terminal can be categorized as a handheld terminal or a vehicle mount terminal depending on whether the mobile terminal can be removed from a vehicle.

Efforts are ongoing to support and increase the functionality of mobile terminals. Such efforts include software and hardware improvements, as well as changes and improvements in the structural components which form the mobile terminals.

In particular, there is a demand for a user interface allowing users to easily and conveniently edit content in such mobile terminals.

SUMMARY OF THE INVENTION

In one aspect of the present invention, a mobile terminal includes a memory, a display configured to display a plurality of icons, each icon representing separate content stored in the memory, an input unit configured to sense a user touch input, and a controller configured to select at least two of the plurality of icons in response to the user touch input causing the at least two of the plurality of icons to be at least partially overlapped, and to combine the contents represented by the at least two of the plurality of icons according to a specified order to generate a new icon representing the combined contents.

It is contemplated that the user touch input is one of a contact touch-and-drag operation, a proximity touch-and-drag operation, and a key drag operation. It is further contemplated that the specified order corresponds to a drag order of the at least two of the plurality of icons.

It is contemplated that each of the contents is one of an image, a music, a photo, a video, a document, and a slide show. It is further contemplated that the controller is further configured to display a combining method selection screen image to receive a combining method and combine the selected contents according to the combining method.

It is contemplated that the controller is further configured to detect a wobbling of the mobile terminal after the at least two of the plurality of icons have been selected, determine a combining method based on the detected wobbling, and combine the contents corresponding to the at least two of the plurality of icons according to the combining method.

In one aspect of the invention, a method for combining contents in a mobile terminal includes displaying a plurality of icons, each icon representing previously stored separate content, sensing a user touch input, selecting at least two of the plurality of icons in response to the user touch input causing the at least two of the plurality of icons to be at least partially overlapped, and combining the contents represented by the at least two of the plurality of icons according to a specified order to generate a new icon representing the combined contents.

It is contemplated that the user touch input is one of a contact touch-and-drag operation, a proximity touch-and-drag operation, and a key drag operation. It is further contemplated that the specified order corresponds to a drag order of the at least two of the plurality of icons.

It is contemplated that each of the contents is one of an image, a music, a photo, a video, a document, and a slide show.

It is contemplated that the combining the contents includes displaying a combining method selection screen image for selecting a combining method when the selecting the at least two of the plurality of icons is completed and combining the selected contents according to the selected combining method.

It is contemplated that the combining the contents includes detecting a wobbling of the mobile terminal after the selecting the at least two of the plurality of icons is completed, determining a combining method based on the detected wobbling, and combining the contents corresponding to the at least two of the plurality of icons according to the combining method.

In one aspect of the invention, a method for combining contents in a mobile terminal includes displaying a plurality of icons, each icon representing previously stored separate content, sensing a user touch input, selecting at least two of the plurality of icons in response to the user touch input, and combining the contents represented by the at least two of the plurality of icons according to a specified order to generate a new icon representing the combined contents.

It is contemplated that the selecting the at least two of the plurality of icons includes moving a first icon among the plurality of icons via a first touch and drag operation to a second icon and selecting the first and second icons when the first icon at least partially overlaps the second icon upon completion of the first touch and drag operation.

It is contemplated that the selecting the at least two of the plurality of icons includes moving a third icon among the plurality of icons via a second touch and drag operation to the second icon and selecting the third icon when the third icon at least partially overlaps the second icon upon completion the second touch and drag operation.

It is contemplated that the selecting the at least two of the plurality of icons includes selecting a region according to a first touch and drag operation and selecting the at least two of the plurality of icons positioned within the region upon completion of the first touch and drag operation.

It is contemplated that the selecting the at least two of the plurality of icons includes detecting a movement path of a pointer via a first touch and drag operation and selecting the at least two of the plurality of icons situated on the movement path of the pointer upon completion of the first touch and drag operation.

It is contemplated that the combining the contents includes displaying a combining method selection screen image for receiving a combining method when the selecting the at least two of the plurality of icons is completed and combining the selected contents according to the selected combining method.

It is contemplated that the combining the content includes detecting a wobbling of the mobile terminal after the selecting the at least two of the plurality of icons is completed, determining a combining method based on the detected wobbling, and combining the contents corresponding to the at least two of the plurality of icons according to the combining method.

It is contemplated that the combining method is determined based on the detected wobbling time and strength of the mobile terminal.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 1 illustrates a block diagram of a mobile terminal in accordance with one embodiment of the present invention.

FIG. 7 is a flow chart illustrating a method for combining contents in the mobile terminal in accordance with one embodiment of the present invention.

DETAILED DESCRIPTION OF THE PREFERRED EMBODIMENTS

Figure 2A:
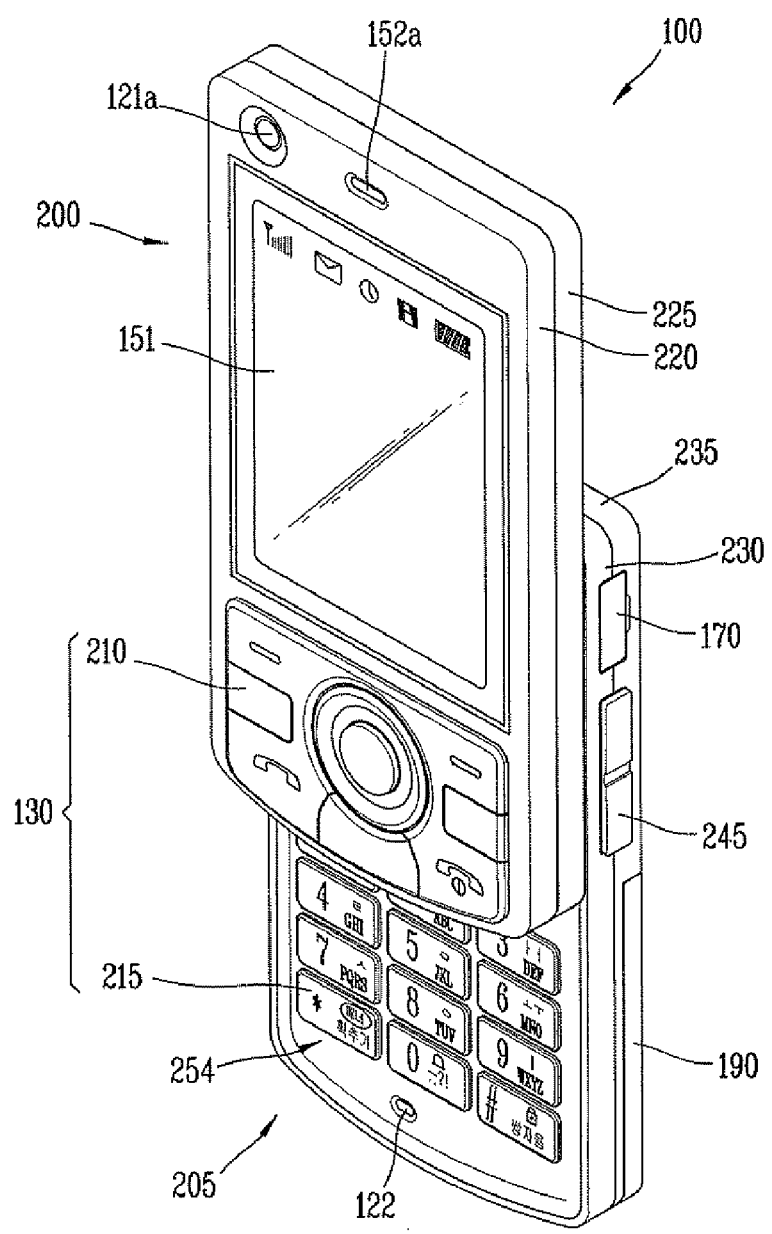
FIG. 2A is a front perspective view of the mobile terminal in accordance with one embodiment of the invention.

The present invention will hereinafter be described in detail with reference to the accompanying drawings in which exemplary embodiments of the invention are shown.

The term "mobile terminal," as used herein, may indicate a mobile phone, a smart phone, a laptop book computer, a digital broadcast receiver, a personal digital assistant (PDA), a portable multimedia player (PMP), or a navigation device.

FIG. 1 illustrates a block diagram of a mobile terminal 100 in accordance with one embodiment of the present invention. As shown in FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1 without departing from the spirit and scope of the invention.

The wireless communication unit 110 includes a broadcast receiving module 111, a mobile communication module 112, a wireless Internet module 113, a short-range communication module 114, and a location information module 115.

The broadcast receiving module 111 can be configured to receive a broadcast signal and/or broadcast-related information from an external broadcast management server, or other network entity, via a broadcast channel. For example, the broadcast channel can be a satellite channel or a terrestrial channel. The broadcast management server can be a server configured to generate broadcast signals and/or broadcast-related information and transmit the generated broadcast signals and/or the generated broadcast-related information, or a server which receives and then transmits previously-generated broadcast signals and/or previously-generated broadcast-related information.

The broadcast signal can be, for example, a TV broadcast signal, a radio broadcast signal, a data broadcast signal, or the combination of a data broadcast signal and either a TV broadcast signal or a radio broadcast signal. The broadcast-related information can be provided to the mobile terminal 100 via a mobile communication network. In this case, the broadcast-related information can be received by the mobile communication module 112, rather than the broadcast reception module 111. The broadcast-related information can take various forms, such as an electronic program guide (EPG) of digital multimedia broadcasting (DMB) or an electronic service guide (ESG) of digital video broadcast-handheld (DVB-H).

The broadcast receiving module 111 can be configured to receive the broadcast signals broadcast by various types of broadcasting systems such as digital multimedia broadcasting-terrestrial (DMB-T), digital multimedia broadcasting-satellite (DMB-S), the data broadcasting system known as media forward link only (MediaFLO®), digital video broadcast-handheld (DVB-H), or integrated services digital broadcast-terrestrial (ISDB-T). In addition, the broadcast receiving module 111 can be configured to be suitable for nearly all types of broadcasting systems other than those set forth herein.

The broadcast signal and/or the broadcast-related information received via the broadcast receiving module 111 can be stored in a storage medium, such as the memory 160.

The mobile communication module 112 transmits and/or receives wireless signals to and/or from at least one of a base station, an external terminal, or a server. For example, the base station can be access point or a Node B, the external terminal can be a user device, and the server can be a server in a different network. The wireless signals can include various types of data according to whether the mobile terminal 100 transmits or receives voice call signals, video call signals, or text/multimedia messages.

The wireless Internet module 113 can be configured to wirelessly access the Internet. The wireless Internet module 113 can be embedded in the mobile terminal 100 or can be installed in an external device. The wireless Internet module 113 can use various wireless Internet techniques, such as wireless fidelity (WiFi), Wireless Broadband (Wibro), World Interoperability for Microwave Access (WiMAX) or High-Speed Downlink Packet Access (HSDPA).

The short-range communication module 114 can support short-range or local area communication. The short-range communication module 114 can use various short-range communication techniques, such as Bluetooth™, radio-frequency identification (RFID), Infrared Data Association (IrDA), Ultra-wideband (UWB), or ZigBee™.

The location information module 115 is a module for checking or acquiring a location or position of the mobile terminal 100. In one embodiment, the location information module 115 can be a Global Positioning System (GPS) module. For example, the GPS module can receive accurate time information and can calculate distance information from three or more satellites. Trigonometry can then be applied to the calculated distance information to accurately calculate three-dimensional current location information in terms of latitude, longitude, and altitude information. Location and time information can also be calculated by using three satellites and correcting an error of the calculated location and time information using another single satellite. In addition, the GPS module can be configured to calculate speed information by continuously calculating the current location in real time.

As shown in FIG. 1, the A/V input unit 120 can be used to receive audio signals or video signals. The A/V input unit 120 can include a camera 121a and a microphone module 122. For example, the camera 121a can process various image data, such as still images or moving images captured by an image capture device in a video capturing mode or an image capturing mode. The image frames processed by the camera 121a can be displayed by a display unit, such as display unit 151.

The image frames processed by the camera 121a can be stored in the memory 160 or other storage medium, or transmitted outside the mobile terminal 100 via the wireless communication unit 110. Other embodiments of the mobile terminal 100 can include more than camera 121a.

The microphone module 122 can receive external sound signals in a phone call mode, a recording mode, or a voice recognition mode via a microphone and can process such sound signals into audio data. For example, when the mobile terminal 100 is in the phone call mode, the mobile communication module 112 can convert the audio data into data that can be transmitted to a mobile communication base station and output the data. The microphone module 122 can include various types of noise removal algorithms to remove or suppress any undesirable noise that may be generated during the reception of external sound signals.

The user input unit 130 can be a user input device configured to generate key input data based on user inputs for controlling the various operations of the mobile terminal 100. The user input unit 130 may be implemented as a keypad, a dome switch, a touch pad, a jog wheel, or a jog switch for allowing the user to input various types of information. For example, the touch pad can be a touch sensitive member configured to detect changes in resistance, pressure, or capacitance in response to a user contact. In particular, if the user input unit 130 is implemented as a touch pad and forms a mutual layer structure along with the display unit 151, the user input unit 130 and the display unit 151 may be collectively referred to as a touch screen.

The sensing unit 140 can detect a current state of the mobile terminal 100, such as whether the mobile terminal 100 is in an opened or closed state, the location or orientation of the mobile terminal 100, the absence or presence of user contact with the mobile terminal 100, and an acceleration or deceleration and direction of a movement of the mobile terminal 100. The sensing unit 140 can be configured to generate a sensing signal for controlling the operation of the mobile terminal 100. For example, when the mobile terminal 100 is a slide-type mobile phone, the sensing unit 140 can detect whether the mobile terminal 100 is opened or closed. Furthermore, the sensing unit 140 can be configured to detect whether the mobile terminal 100 is powered by the power supply unit 190 and whether the interface unit 170 is connected to an external device.

The interface unit 170 can interface with an external device that can be connected to the mobile terminal 100. For example, the interface unit 170 can be a wired/wireless headset port, an external battery charger port, a wired/wireless data port, a memory card port, ports for connecting a device having an identification module, an audio input/output (I/O) port, a video I/O port, or an earphone port.

The identification module may be a memory chip that stores various information for authenticating user's authority for using the mobile terminal 100 and can include a user identity module (UIM), a subscriber identity module (SIM) a universal subscriber identity module (USIM). In addition, the device having the identification module (hereinafter referred to as an "identifying device") can take the form of a smart card. Accordingly, the identifying device may be connected with the mobile terminal 100 via a port or other connection means. The interface unit 170 can be used to receive inputs, such as data or power, from an external device and transfer the received inputs to one or more components within the mobile terminal 100 or may be used to transfer data between the mobile terminal 100 and an external device.

When the mobile terminal 100 is connected to an external cradle (not shown in FIG. 1), power can be supplied from the external cradle to the mobile terminal 100 through the interface unit 170. In addition, various command signals can be transmitted from the external cradle to the mobile terminal 100 through the interface unit 170. Various command signals or power inputted from the cradle may be operated as a signal for recognizing that the mobile terminal is accurately mounted on the cradle.

The output unit 150 can be configured to output audio signals, video signals, alarm signals, or vibration signals. In one embodiment, the output unit 150 can include the display unit 151, audio output modules 152a and 152b, an alarm unit 153.

The display unit 151 can display information processed by the mobile terminal 100. For example, when the mobile terminal 100 is in a phone call mode, the display unit 151 can display a user interface (UI) or a graphic user interface (GUI) associated with a telephone call or other communication, such as a text message communication or multimedia file transfer. For example, the display unit 151 can be configured to display a captured or received image, a UI or a GUI that shows videos or images, when the mobile terminal 100 is in a video call mode or an image capturing mode.

When the display unit 151 and the user input unit 130 are overlaid in a layered manner to form a touch screen, the display unit 151 can be used as an output device, as well as an input device. The touch screen may be configured to detect a touch input pressure as well as a touch input position and a touch input area.

The display unit 151 can include at least a liquid crystal display (LCD), a thin film transistor (TFT)-LCD, an organic light-emitting diode (OLED), a flexible display, or a three-dimensional (3D) display. In one embodiment, the display unit 151 can be a transparent display to allow viewing of the exterior, such as a Transparent Organic Light Emitting Diode (TOLED) display.

In one embodiment, the mobile terminal 100 can include two or more display units 151. For example, the mobile terminal 100 can include an external display unit (not shown) and an internal display unit (not shown).

The proximity sensor 141 can be located within or near the touch screen and configured to detect the absence of objects or the presence of objects in proximity to or approaching the mobile terminal 100, without any physical contact with the object. More specifically, the proximity sensor 141 can detect an object in proximity to or approaching the mobile terminal 100 by detecting a change in an alternating magnetic field or infrared rays. The proximity sensor 141 has a considerably longer life span compared with a contact type sensor.

The proximity sensor 141 can include, for example, a transmission type photo sensor, a direct reflection type photo sensor, a mirror-reflection type photo sensor, an RF oscillation type proximity sensor, a capacitance type proximity sensor, a magnetic proximity sensor, or an infrared proximity sensor.

The operation of an RF oscillation type proximity sensor will now be described. When an object approaches the sensor detection surface in a state when an RF (Radio Frequency) static wave is oscillated by an oscillation circuit, the oscillation amplitude of the oscillation circuit is attenuated or substantially reduced. The change in oscillation amplitude is converted into an electrical signal to detect the presence or absence of an object. Therefore, even if a non-metallic material is positioned between the RF oscillation proximity sensor and an object, a proximity switch can still detect the object despite the presence of the non-metallic material.

If the touch screen is an electrostatic type, the approach of a pointer, such as a stylus, can be detected even without the proximity sensor 141 based on a change in a field according to the approach of the pointer. Therefore, although the pointer is not actually brought into contact with the touch screen, but merely positioned close to the touch screen, the position of the pointer and the distance between the pointer and the touch screen can be detected.

Thus, although the pointer is not actually brought into contact with the touch screen but merely positioned close to the touch screen, the position of the pointer and the distance between the pointer and the touch screen can be detected.

To maintain brevity, recognition of the pointer when the pointer is positioned close to the touch screen will be referred to as a "proximity touch," while recognition of the pointer when the pointer is actually in contact with the touch screen will be referred to as a "contact touch." Therefore, when the pointer has made a proximity touch, it should be understood that the pointer is positioned substantially perpendicular to the surface of the touch screen.

Via the proximity sensor 141, a proximity touch and a proximity touch pattern, such as proximity touch distance, a proximity touch speed, a proximity touch time, a proximity touch position, or a proximity touch movement state can be detected. For example, information corresponding to the detected proximity touch operation and the proximity touch pattern can be output to a touch screen.

The audio output module 152a can output audio data received by the wireless communication unit 110 during a call reception mode, a call mode, a recording mode, a voice recognition mode, or a broadcast reception mode or can output audio data stored in the memory 160. In addition, the audio output module 153 can output various sound signals associated with the functions of the mobile terminal 100, such as receiving a call or a message. The audio output module 152a can include, for example, a speaker, a buzzer, or other sound generating device.

The alarm unit 153 can output an alarm signal indicating the occurrence of an event in the mobile terminal 100, such as receiving a call signal, receiving a message, or receiving a key signal, or a touch input. The alarm signal can be, for example, an audio signal, a video signal, and/or a vibration signal. For example, the alarm unit 153 can output an alarm signal, such as a vibration signal, upon receiving a call signal or a message. Thus, the vibration signal can be detected by the user even when the user cannot see or hear the mobile terminal 100. Once an alarm signal is output by the alarm unit 155, the user can be notified that an event has occurred. An alarm signal for notifying the user of the occurrence of an event can also be output by the display unit 151 or the audio output module 153.

The memory 160 may store various programs that are used for the processing and operations performed by the controller 180. In addition, the memory 160 can store various data such as a phonebook, messages, still images, or moving images.

For example, the memory 160 may include at least one type of storage medium, such as a flash memory, a hard disk, a multimedia card, a micro type memory, a card type memory, such as a secure digital (SD) card or extreme digital (XD) card, a random access memory (RAM), a read-only memory (ROM), an Electrically Erasable Programmable Read-Only Memory (EEPROM), a Programmable Read-Only Memory (PROM), a magnetic memory, a magnetic disk, or an optical disk. In other embodiments, the memory 160 can be a network storage device that can be accessed by the mobile terminal 100 via a network connection.

The controller 180 can be, for example, a microprocessor and can control the general operations of the mobile terminal 100. For example, the controller 180 can perform various control operations related to making and receiving a voice call, transmitting and receiving data, or making and receiving a video call.

The controller 180 can include a multimedia module 181 for reproducing or playing back multimedia data. In one embodiment, the multimedia module 181 can be implemented as a hardware device and can be installed in the controller 180. In another embodiment, the multimedia module 181 may be implemented external to the controller 180.

The controller 180 can perform a pattern recognition processing to recognize a handwriting input or a graphic input performed on the touch screen as characters or images.

The power supply unit 190 receives power from an external power source via a power cable connection or from an internal power source via a battery and supplies appropriate power required for operating respective elements and components under the control of the controller 180.

The various components described herein may be implemented in a computer-readable medium using, for example, computer software, hardware, or any combination thereof.

For example, the components described herein may be implemented in hardware using, for example, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In other embodiments, such components may be implemented in the controller 180.

The procedures or functions described herein may be implemented in software using, for example, separate software modules that allow performing of at least one function or operation. Software codes can be implemented by a software application or program written in any suitable programming language. The software codes may be stored in the memory 160 and executed by the controller 180.

The mobile terminal 100 can be implemented in a variety of different configurations. Examples of such configurations include folder-type, bar-type, swing-type, a slide type configuration. In one embodiment, the mobile terminal 100 can be a slider-type mobile phone. However, in other embodiments, the present invention can be applied to various other types of mobile phones.

FIG. 2A illustrates a front perspective view of the mobile terminal 100 in accordance with one embodiment of the invention.

As shown in FIG. 2A, the mobile terminal 100 includes a first body 200 and a second body 205, which can be slidably moved along at least one direction with respect to the first body 200. In another embodiment where the mobile terminal 100 is implemented in a folder type configuration, the second body 205 can be folded or unfolded with respect to the first body 200.

A state in which the first body 200 is disposed to overlap with the second body 205 is herein referred to as a closed configuration, and a state in which at least a portion of the second body 205 is exposed, as shown in FIG. 2A, is herein referred to as an open configuration.

Although not shown, the mobile terminal according to the present invention may be the folder type mobile terminal including the first body and the second body having one side to be folded or unfolded with respect to the first body. Here, a state in which the second body is folded may be called a closed configuration, and a state in which the second body is unfolded may be called an open configuration.

In addition, although not shown, the mobile terminal according to the present invention may be a swing type mobile terminal including a first body and a second body configured to be swingable with respect to the first body. Here, a state in which the first body is disposed to overlap with the second body may be called a closed configuration, and a state in which the second body is swung to expose a portion of the first body may be called an open configuration.

The folder type mobile terminal and the swing type mobile terminal can be easily known by the person in the art without any explanation, so its detailed description will be omitted.

The mobile terminal 100 generally operates in a standby or idle mode in the closed configuration, where the standby mode can be released in response to a user manipulation. The mobile terminal 100 generally operates in the calling mode in the open configuration and can be changed to the standby mode after a predetermined period of time or in response to a user manipulation.

The case (also referred to in the art as a "casing," "housing," or "cover") constituting the external appearance of the first body 200 includes the first front case 220 and the first rear case 225. It should be understood that various electronic components can be installed in the space between the first front case 220 and the first rear case 225. In other embodiments, one or more intermediate cases can be additionally disposed between the first front case 220 and the first rear case 225.

The first front case 220 and the first rear case 225 can be formed by injection-molding of a synthetic resin or can be formed of a metallic material such as stainless steel (STS) or titanium (Ti), etc.

As shown in FIG. 2A, the display unit 151, the audio output module 152a, the camera 121a or the first user input unit 210 can be located at the first body 200, and in particular, on the first front case 220 of the first body 200.

As shown in FIG. 2A, the case constituting the external appearance of the second body 205 includes the second front case 230 and the second rear case 235. As also shown in FIG. 2A, a second user input unit 215 is located on the second body, and in particular, on the front face 254 of the second body 205. As further shown in FIG. 2A, the third user input unit 245, the microphone 122, and the interface unit 170 is located on the second front case 230 and the second rear case 235.

The first user input unit 210, the second user input unit 215, and the third user input unit 245 are herein collectively referred to as the manipulating portion 130. It can be appreciated that various methods and techniques can be employed for implementing the manipulating portion 130. For example, the manipulating portion 130 can include a dome switch, an actuator, a rotatable control wheel or disc, a key or button, a jog dial, a joystick and/or a touch pad region that can receive user commands or information via a touch input. The touch input can be, for example, a pressing, pushing, swiping, or a drag-and-drop.

In one embodiment, the first user input unit 210 can be configured to receive various commands, such as a "start" command, an "end" command, or a "scroll" command. The second user input unit 215 can be configured for receiving numbers, characters, and symbols. For example, the first user input unit 210 can include a soft key by enabling selection of icons displayed on the display unit 151 using navigation key for indicating and checking directions. The navigation key can include, for example, four direction keys and a central key. The third user input unit 245 can support hot key functions that allow more convenient activation of particular functions of the mobile terminal 100.

As shown in FIG. 2A, the power supply unit 190 is located on the second rear case 235.

Figure 2B:
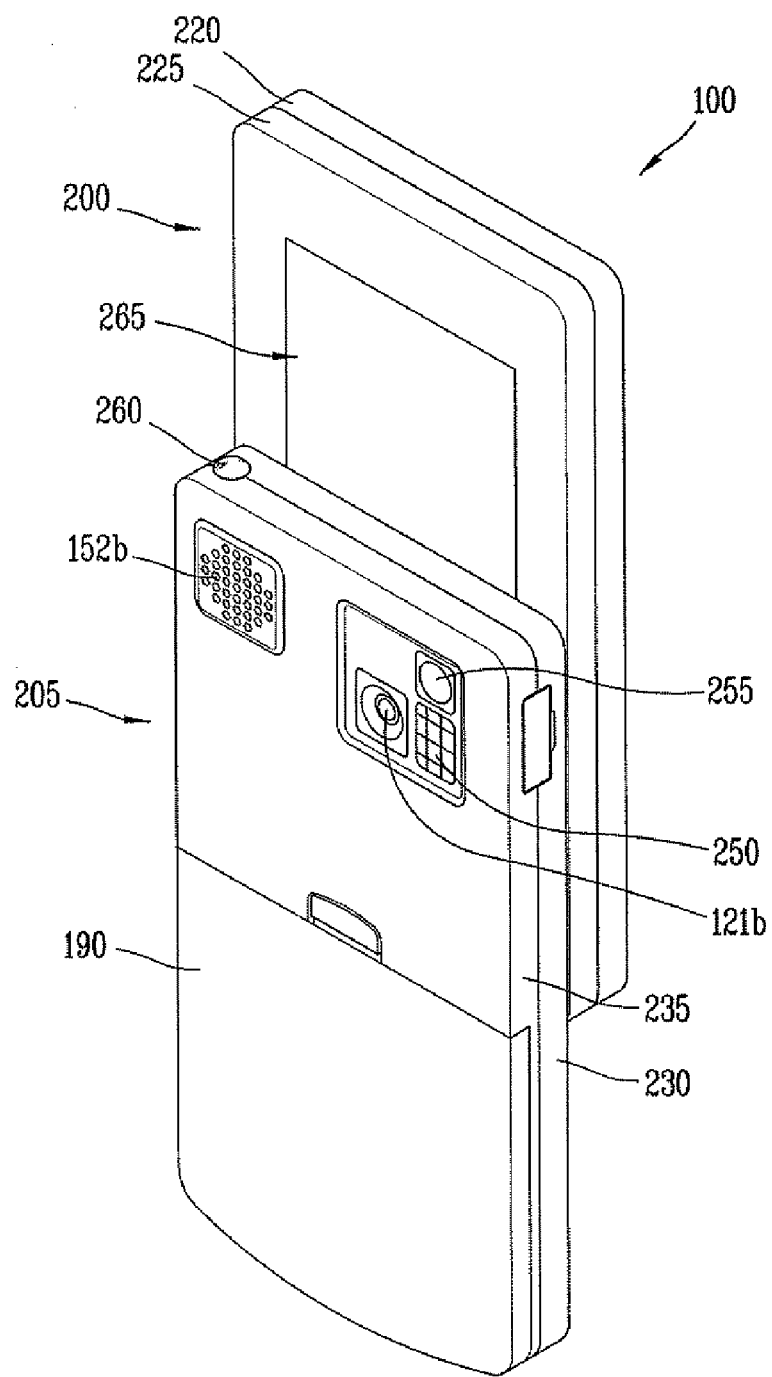
FIG. 2B is a rear perspective view of the mobile terminal in accordance with one embodiment of the present invention.

FIG. 2B is a rear perspective view of the mobile terminal 100 in accordance with one embodiment of the present invention.

As shown in FIG. 2B, a camera 121b is located on the rear surface of the second rear case 235 of the second body 205. The camera 121b on the second body 205 has a direction of view which is substantially opposite to the direction of view of the camera 121a on the first body 200.

In one embodiment, the camera 121a can be configured to operate with a relatively lower resolution than the camera 121b. For example, the camera 121a can be used to capture an image of the user to allow immediate transmission of the image during a video call and the camera 121b can be used to capture images of general objects with high picture quality, which may not require immediate transmission in real-time, but may be stored for later viewing or use.

As shown in FIG. 2B, the flash 250 and the mirror 255 are located near the second camera 121b. The mirror 255 allows self-image capturing by allowing the user to see herself when the user desires to capture her own image using the camera 121b. The flash 250 can illuminate a subject when the second camera 121b captures an image of the subject.

As also shown in FIG. 2B, the audio output module 152b is located on the rear case 235 of the second body 205. The audio output module 152b can support a stereophonic sound function along with the audio output module 153a. The audio output module 152b can also be used during a speaker-phone mode.

The first slide module portion 265 enabling the first body 200 and the second body 205 to slide relative to one another can be located on the first rear case 225 of the first body 200. A second slide module portion (not shown in FIG. 2B) is located on the second front case 230 of the second body 205.

The antenna 260 is located on the second body 205 and is configured to receive a wireless communication signal. The antenna 260 can be extended and retracted from the rear case second body 205.

In other embodiments, the antenna 260, the camera 121b, the flash 250, the mirror 255, and the audio output module 152b can be located on the first body 200, mainly, on the first rear case 225. In this case, those elements disposed on the first rear case 225 can be covered and thus protected by the second body 205 in the closed configuration. In addition, even if the camera module 151b is not included in the mobile terminal 100, the camera module 121a can be configured to rotate or move to allow image capturing in various directions.

Figure 3:
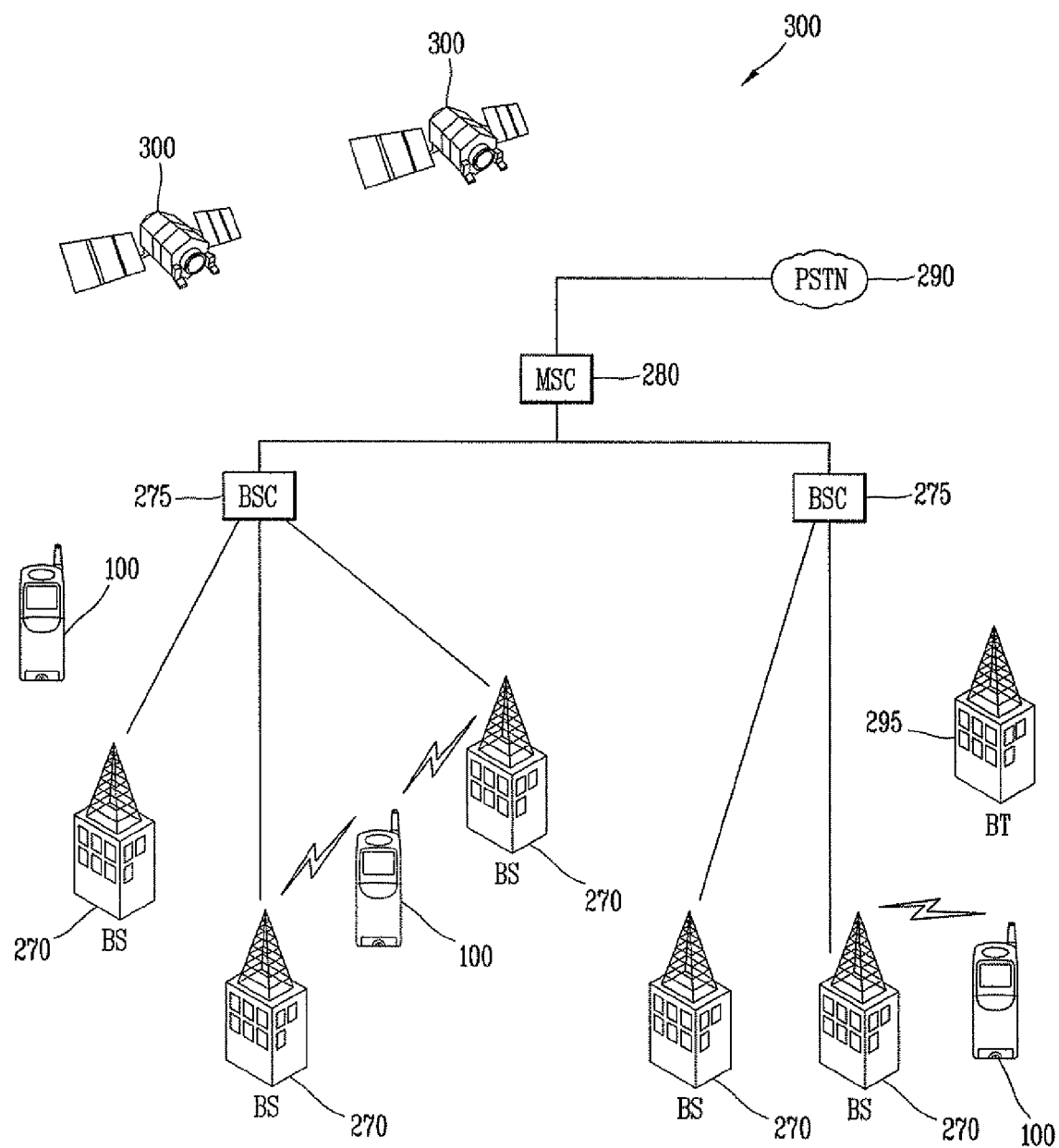
FIG. 3 shows a mobile communication system 400 in which the mobile terminal 100 can be configured to operate.

FIG. 3 shows a mobile communication system 300 in which the mobile terminal 100 can be configured to operate.

The mobile communication system 300 can be configured to transmit data via frames or packets via wired and wireless communication systems, as well as satellite-based communication systems.

Communication systems can typically use different air interfaces and/or physical layers. For example, air interfaces utilized by communication systems include, frequency division multiple access (FDMA), time division multiple access (TDMA), code division multiple access (CDMA), global system for mobile communications (GSM), universal mobile telecommunications system (UMTS), and long term evolution (LTE). Although the description hereafter relates to a CDMA communication system, it should be understood that other types of communication systems may be used without departing from the scope of the invention.

In the embodiment of FIG. 3, the mobile communication system 300 is implemented as a CDMA wireless communication system and includes a plurality of mobile terminals 100, a plurality of base stations (BSs) 270, base station controllers (BSCs) 275, and a mobile switching center (MSC) 280. The MSC 280 is configured to interface with a public switched telephone network (PSTN) 290. The MSC 280 is also configured to interface with the BSCs 275, which may be coupled to the BSs 270 via backhaul lines. The backhaul lines may be configured in accordance with any of several known interfaces, such as E1/T1, Asynchronous Transfer Mode (ATM), Internet Protocol (IP), Point-to-Point Protocol (PPP), Frame Relay, High bit rate Digital Subscriber Line (HDSL), Asymmetric Digital Subscriber Line (ADSL), or Digital Subscriber Line (xDSL).

Each BS 270 may serve one or more sectors (or regions), where each sector is covered by an omni-directional antenna or an antenna pointed in a particular direction radially away from the BS 270. Alternatively, each sector may be covered by two or more antennas for diversity reception. Each BS 270 may be configured to support a plurality of frequency assignments, each frequency assignment having a particular spectrum, such as 1.25 MHz or 5.0 MHz.

The intersection of a sector and frequency assignment may be referred to as a CDMA channel. The BSs 270 may also be referred to as "base station transceiver subsystems" (BTSs) or other equivalent terms. In such a case, the term "base station" may be used to collectively refer to a single BSC 275 and at least one BS 270. The base station may also be referred to as a "cell site." Alternatively, individual sectors of a particular BS 270 may be referred to as a plurality of cell sites.

As shown in FIG. 3, a broadcasting transmitter (BT) 295 transmits a broadcast signal to the mobile terminals 100 operating within the mobile communication system 300. The mobile terminal 100 can receive broadcast signals transmitted by the BT 295 via the broadcast receiving module 111 shown in FIG. 1.

FIG. 3 shows global positioning system (GPS) satellites 300. The GPS satellites 300 are used to locate at least one of a plurality of the mobile terminals 100. The location information module 115 shown in FIG. 1 is configured to cooperate with the GPS satellites 300 to obtain desired positioning information.

Although FIG. 3 shows two GPS satellites 300, it should be understood that positioning information may be obtained with any number of GPS satellites 300. Moreover, techniques for tracking using technologies other than, or in addition to, GPS technology may be used to determine the location of the mobile terminals 100. In addition, at least one of the GPS satellites 300 may selectively or additionally handle satellite DMB transmissions.

In one typical operation of the wireless communication system 300, the BSs 270 receive reverse-link signals from various mobile terminals 100 when the mobile terminals 100 are engaging in calls, messaging, and other types of communications. Each reverse-link signal received by a particular BS 270 is processed by that particular BS 270. The processed data is then forwarded to a BSC 275 associated with the BS 270.

The BSC 275 provides call resource allocation and mobility management functionality including the coordination of soft handoff procedures between the BSs 270. The BSCs 275 also route the received data to the MSC 280, where the MSC 280 provides additional routing services for interfacing with the PSTN 290. The PSTN 290 interfaces with the MSC 280, which interfaces with the BSCs 275. The BSCs 275 in turn control the BSs 270 to transmit forward-link signals to the mobile terminals 100.

A method for combining contents by using icons in the mobile terminal 100 will now be described. For example, the contents can include music, image, photo, video, a document including text, and a slide show.

The mobile terminal 100 includes a display unit 151 implemented as a touch screen. The display unit 151 displays stored contents as icons on a display screen under the control of the controller 180. The icons can be implemented as thumbnails or any other images representing types of contents. For example, the icons can be displayed along with file names of the contents.

In one embodiment, when a proximity touch applied to the touch screen of the mobile terminal 100 is detected, the controller 180 can display a file name or a name of the content corresponding to the proximity-touched icon in a "bubble" window form.

When one or more of the icons displayed on the screen of the display unit 151 are selected in via a touch-and-drag operation, the controller 180 generates new contents by combining contents corresponding to the selected icons. For example, the touch-and-drag operation be one of a contact touch-and-drag, a proximity touch-and-drag, and a key drag operation performed by controlling a pointer displayed on the display unit 151 through manipulation of a direction key. For example, the controller 180 can generate video contents by combining music contents and image contents or new video contents by combining video contents and video contents.

The method used for combining contents can be selected by a user or randomly selected by detecting wobbling of the mobile terminal 100. In this case, the sensing unit 140 can detect a user input such as a touch or wobbling of the mobile terminal 100. The sensing unit 140 can include, for example, a touch sensor and a proximity sensor for detecting a touch or proximity of a pointer, and a tilt sensor or gyro sensor for detecting wobbling of the terminal. The controller 180 can determine one of various combining methods of contents based on a wobbling time and strength of the mobile terminal 199 detected via the sensing unit 140.

Figure 4:
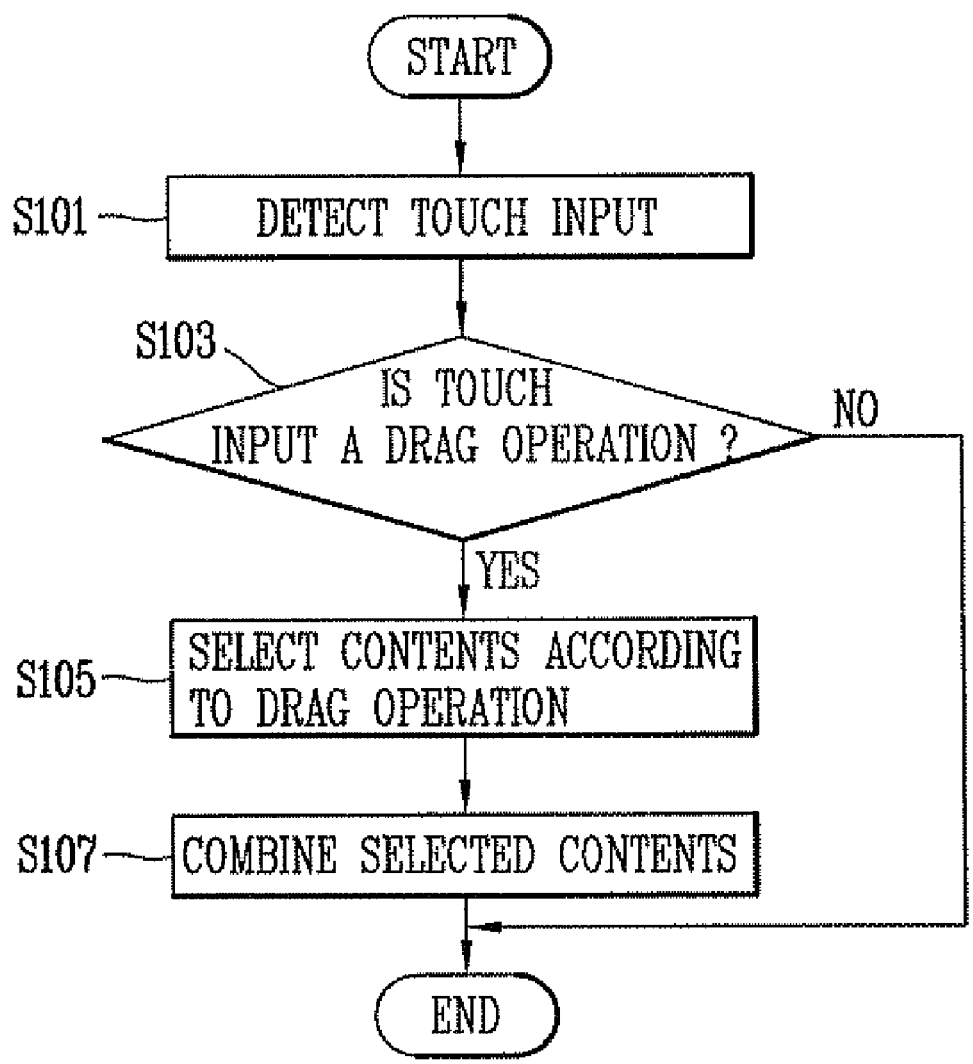
FIG. 4 illustrates a flow chart of a method for combining contents in a mobile terminal using icons in accordance with one embodiment of the present invention.

FIG. 4 illustrates a flow chart of a method for combining contents in the mobile terminal 100 using icons in accordance with one embodiment of the present invention.

As shown in FIG. 4, the sensing unit 140 can detect a touch applied to the screen of the display unit 151 (S101). For example, when a pointer touches a specific location on the screen, the sensing unit 140 detects the pointer's touch and outputs a corresponding signal. In the present embodiment, the display unit 151 is configured to display various content using icons under the control of the controller 180. The content can be, for example, music, an image, a video, a document including text, or a slide show. The specific location can include at least a portion of an icon displayed in the display screen. For example, when the user selects a function for combining contents or a contents storage box, the controller 180 displays a stored contents list as icons in the display unit 151. Thereafter, when a touch applied to the screen of the display unit 151 is detected, the sensing unit 140 detects the touch and informs the controller 180 accordingly.

The controller 180 then determines whether the detected touch input is a drag operation (S103). If the touch input is a drag operation, the controller 180 selects contents to be combined based on the drag operation (S105). For example, when an icon is moved by a drag operation and at least one portion of the moved icon overlaps a different icon, the controller 180 determines that the contents corresponding to the moved icon and the different icon are to be combined upon completion of the drag operation.

In another embodiment, the controller 180 can determine the contents to be combined by selecting the contents corresponding to icons positioned within a region that is selected by a dragging operation. For example, the controller 180 can be configured to determine the contents to be combined by recognizing icons situated within or outside a free line drawn by a dragging operation.

Once the contents have been selected, the controller 180 combines the contents to generate a new content (S107). In one embodiment, the controller 180 can be configured to combine a first type of content with a second type of content to generate a third type of content. For example, the controller 180 can be configured to combine an image and a document to generate a video.

FIGS. 5A to 5D are overviews of display screens illustrating techniques for selecting and combining contents in the mobile terminal 100 in accordance with one embodiment of the present invention.

Figure 5A:
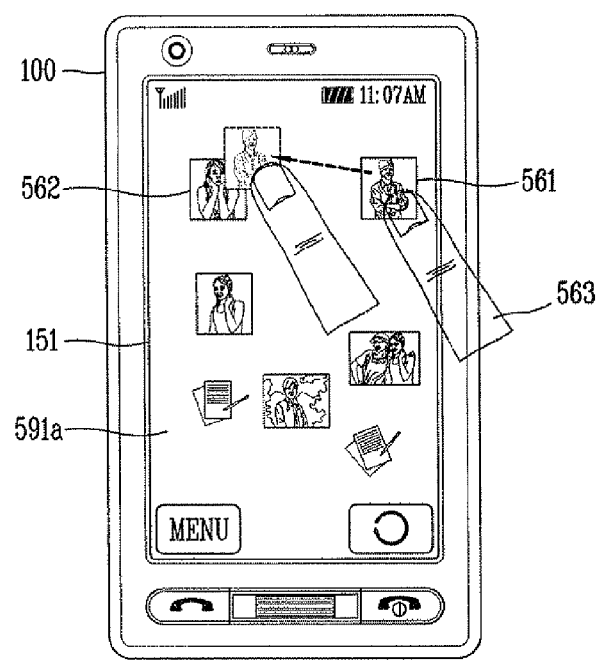
FIGS. 5A to 5D are overviews of display screens illustrating techniques for selecting and combining contents in the mobile terminal 100 in accordance with one embodiment of the present invention.

With reference to FIG. 5A, the controller 180 displays a number of icons, such as first and second icons 561 and 562, representing various content in a screen 591a of the display unit 151. For example, the content can be music, a video, an image, a document, or a slide show. In one embodiment, each icon can be displayed as a thumbnail or as a particular image indicating a type of file. For example, if the content is a video, the controller 180 can display a first frame of the video as a thumbnail or can display a camcorder image.

As shown in FIG. 5A, when the pointer 563 touches the first icon 561 among the icons displayed in a screen of the display unit 151 and moves the first icon 561 to the second icon 562 while maintaining the touch, the controller 180 moves the first icon 561 according to the movement of the pointer 563. If the first icon 561 overlaps at least a portion of the second icon 562 when the pointer releases the touch, the controller 180 determines that the content corresponding to each of the first and second icons 561 and 562 are the contents to be combined.

Figure 5B:
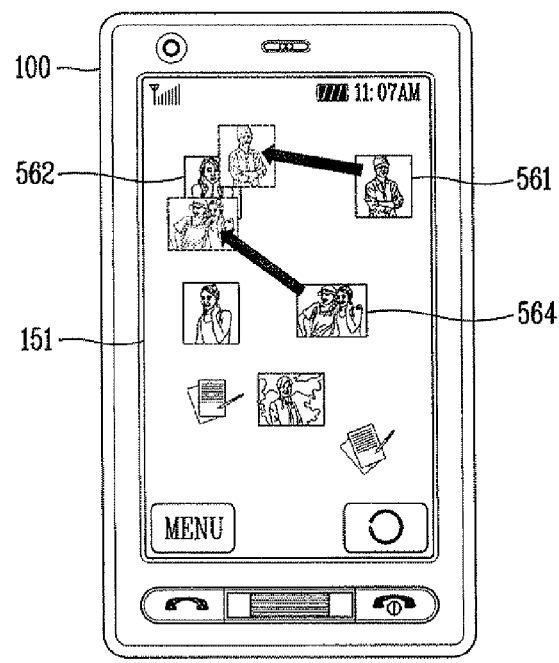

As shown in FIG. 5B, additional content corresponding to other icons, such as the third icon 564, can be further combined with the already combined content corresponding to the first and second icons 561 and 562 by dragging the third icon 564 to overlap with the second icon 562. The controller 180 recognizes the content corresponding to the third icon 564 as the content to be combined. In one embodiment, the controller 180 can determine an arrangement of contents, such as order or alignment, in combining the contents according to a touch and drag order.

Although the embodiments above describe the icons as being dragged one by one, it should be understood that in other embodiments, multiple icons can be simultaneously moved to overlap a particular icon in a multi-touch-and-drag manner, thereby enabling a plurality of contents to be selected at a time. In other words, when two or more icons are simultaneously dragged to overlap with at least a portion of a particular icon, the controller 180 recognizes the content corresponding to the plurality of overlapping icons as the contents to be combined.

Figure 5C:
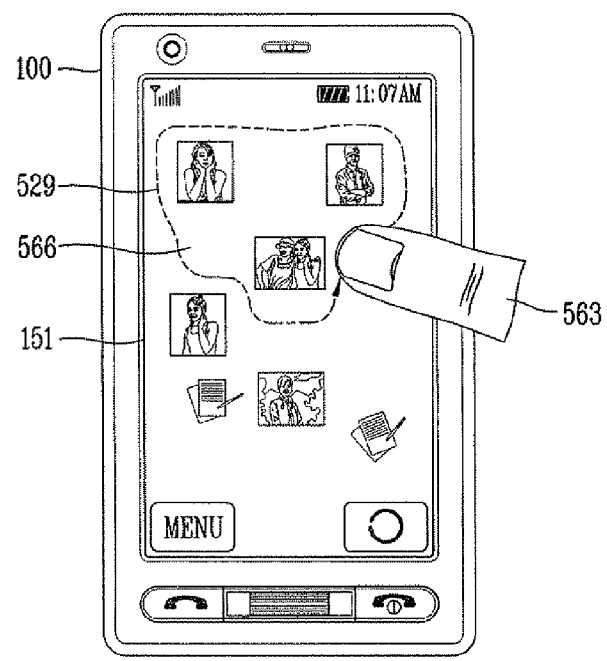

As shown in FIG. 5C, when the pointer 563 draws a free line on the display unit 151 in a touch-and-drag manner and selects a particular region, such as the region 566, the sensing unit 140 detects a movement path 529 of the pointer 563 and informs the controller 180 accordingly. When the touch is released, the controller 180 recognizes the contents corresponding to icons positioned within the particular region, that is, region 566, drawn by the touch-and-drag operation as the contents to be combined.

Figure 5D:
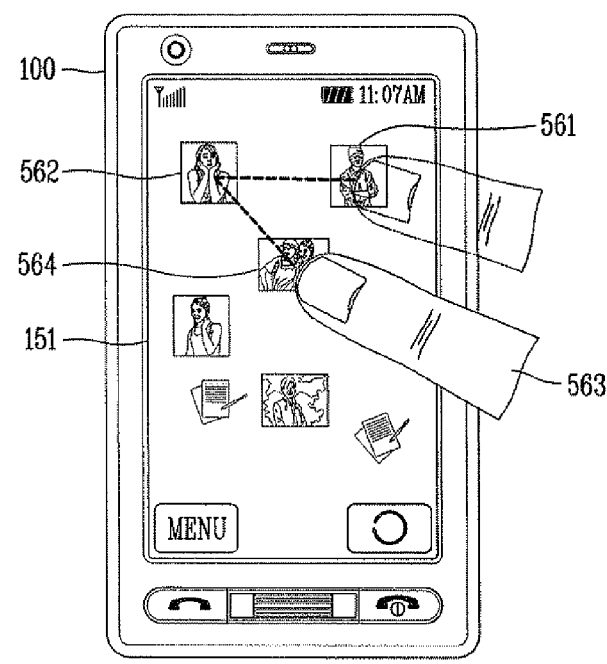

With reference to FIG. 5D, when the pointer 563 touches one of the icons displayed in the display unit 151, such as the first icon 561, and moves the icon by drawing a free line while maintaining the touch, the sensing unit 140 detects a movement path of the pointer 563. The controller 180 recognizes contents corresponding to icons situated on the movement path of the pointer 563 as the contents to be combined. For example, when the pointer 563 is moved in a touch-and-drag manner through various icons, the controller 180 recognizes the contents corresponding to the various icons as the contents to be combined.

Figure 6A:
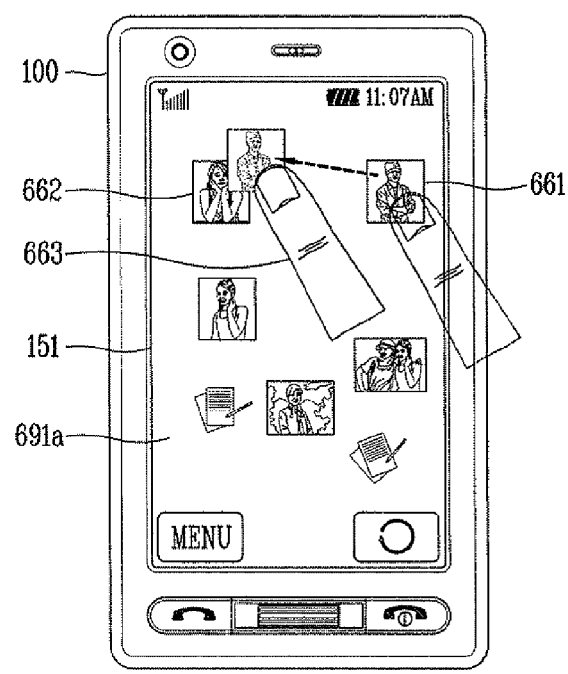
FIGS. 6A and 6B are overviews of display screens illustrating techniques for selecting and combining contents in the mobile terminal in accordance with one embodiment of the present invention.
Figure 6B:
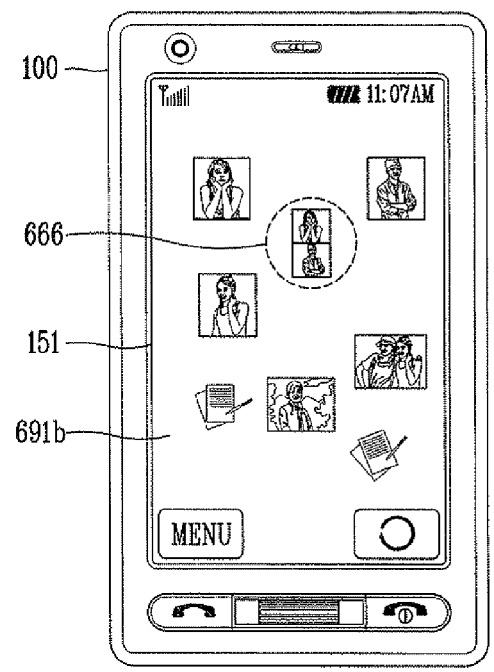

FIGS. 6A and 6B are overviews of display screens illustrating techniques for selecting and combining contents in the mobile terminal 100 in accordance with one embodiment of the present invention.

As shown in FIG. 6A, a touch-and-drag of the pointer 663 applied to the first icon 661 displayed in the screen 691*a* in the display unit 151 is detected by the sensing unit 140. For example, when the user contacts the first icon 661 among icons displayed in the display unit 151 with the pointer 663 and moves the pointer 663 while maintaining the contact, the sensing unit 140 detects the touch-and-drag. At this time, the controller 180 moves a copy of the first icon 661 along the movement path of the pointer 663. Accordingly, the controller 180 can display the movement of the copy of the first icon 661 with respect to the pointer 663, while maintaining the first icon 661 at its original position.

After the pointer 663 is moved to the second icon 662, when the touch-and-drag of the pointer 663 is released, the controller 180 combines the contents corresponding to the first and second icons 661 and 662 to generate new contents. As shown in FIG. 6B, the controller 180 then stores the new contents in the memory 160 and displays a new contents icon 666 corresponding to the new contents in the display unit 151.

FIG. 7 is a flow chart illustrating a method for combining contents in the mobile terminal 100 in accordance with one embodiment of the present invention.

Once a user selects a contents storage box, the controller 180 displays the list of contents stored in the memory 160 as icons in a display screen on the display unit 151. The controller 180 then detects a touch-and-drag applied on the display screen displaying the icons (S201). When a touch-and-drag operation is performed on one of the icons displayed in the display screen, the sensing unit 140 detects the touch input and informs the controller 180 accordingly.

The controller 180 then selects two or more contents on the contents list displayed on the display screen as contents to be combined based on the detected touch input (S203). For example, the controller 180 selects contents to be combined according to one of the content selection methods shown in FIGS. 5A through 5D.

The controller 180 proceeds to determine whether the selection of the contents to be combined via the touch-and-drag operation has been completed (S205). When selection of the contents to be combined is completed, the controller 180 selects a method for combining the selected contents (S207).

For example, when a first content, a second content, and a third content respectively represented by first, second, and third icons are to be combined, the user can move two of the icons to the remaining icon via a touch-and-drag operation using a pointer such that portions of the icons overlap with one another. Thereafter, if the combining function is selected through menu manipulation or if there is no touch-and-drag input for a certain period of time, the controller 180 displays a setting screen on the display unit 151 for selecting a method for combining the contents. For example, when a combining command is inputted, the controller 180 displays a screen image for selecting a combining method (S207).

When one of combining methods displayed on the display unit 151 is selected via a user input, the controller 180 combines the selected contents according to the selected combining method to generate new contents (S209). The controller 180 stores the generated combined contents in the memory 160 and generates and displays an icon corresponding to the combined contents on the display unit 151.

FIGS. 8A through 8D are overviews of display screens illustrating techniques for selecting and combining two images in the mobile terminal 100 in accordance with one embodiment of the present invention.

Figure 8A:
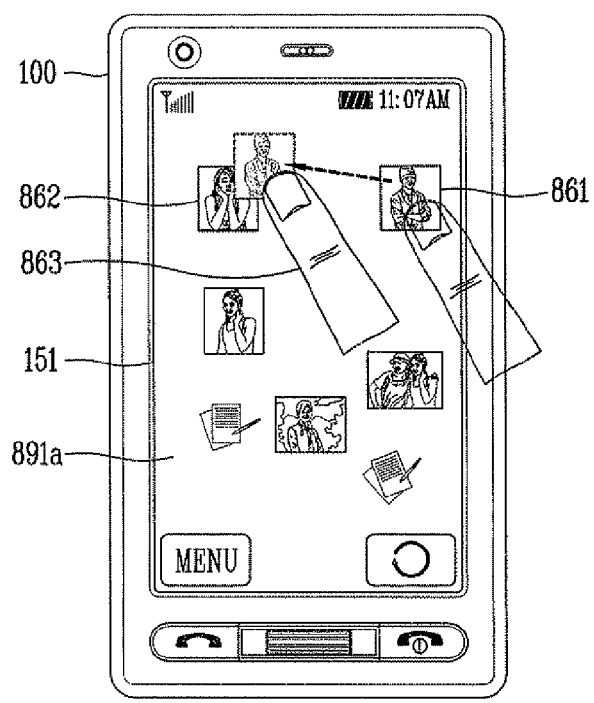
FIGS. 8A through 8D are overviews of display screens illustrating techniques for selecting and combining two images in the mobile terminal in accordance with one embodiment of the present invention.

As shown in FIG. 8A, the controller 180 displays a number of contents stored in the memory 160 as icons in the display screen 891 on the display unit 151 according to a user input. As further shown in FIG. 8A, the controller 180 can display the various contents without discriminating as to the types of contents.

When the pointer 863 contacts a first icon 861 displayed on the display screen 891*a*, the sensing unit 140 detects the contact and informs the controller 180 accordingly.

After the pointer contacts the first icon 861 and as the pointer 863 is moved to the second icon 862 while maintaining the contact to perform a touch-and-drag operation, the controller 180 checks the movement path of the pointer 863 via the sensing unit 140. The controller 180 moves the first icon 861 in a direction of the second icon 862 along the movement path of the pointer 863.

Figure 8B:
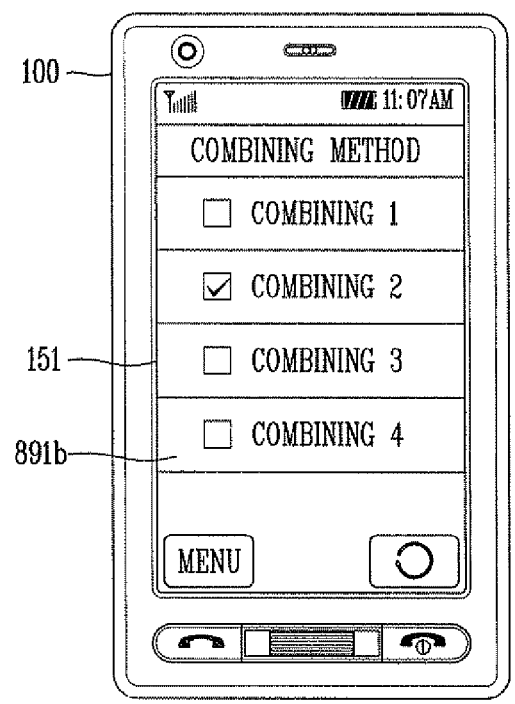

After the first icon 861 is moved to overlap with at least a portion of the second icon 862, upon releasing the contact of the pointer 863, the controller 180 selects the contents corresponding to the first and second icons 861 and 862 as the contents to be combined. Also, when the contact of the pointer 863 is released in a state that the first and second icons 861 and 862 overlap, the controller 180 recognizes the release of the contact as a command for combining contents. Accordingly, the controller 180 displays a combining method selection screen 891*b* for selecting a method for combining the selected contents on the display unit 151, as shown in FIG. 8B.

When one of combining methods displayed on the display unit 151 is selected, the controller 180 combines the selected contents according to the selected combining method. For example, as shown in FIG. 8C, if two selected contents are both images and the selected combining method is configured to arrange the images vertically, the controller 180 performs an editing (combining) operation to vertically arrange the two images selected by the user's touch-and-drag operation vertically and to generate a single image.

Figure 8C:
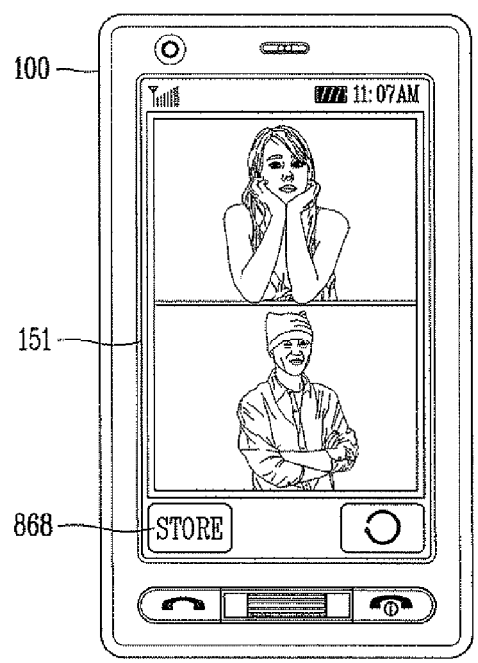

When combining of the contents is completed, the controller 180 displays the combined contents according to the combining method selected as a preview on the display unit 151, as shown in FIG. 8C.

Figure 8D:
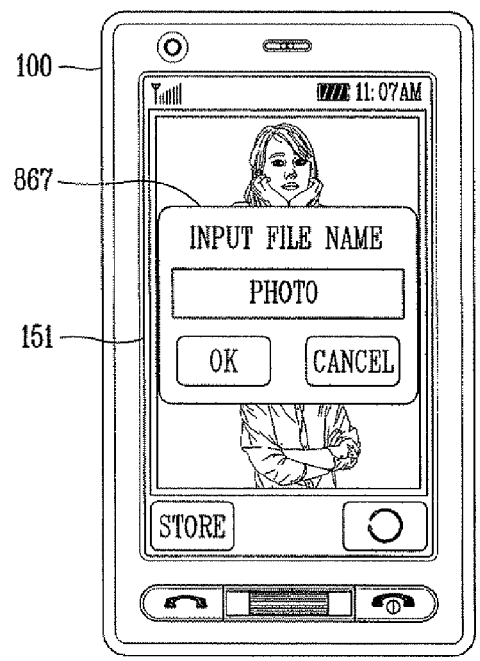

After the combined contents are checked in the preview and when a "store" command is received by the controller 180, the controller 180 stores the combined contents in the memory 160. For example, a "store" command can be received via the store button 868 shown in FIG. 8C. Thereafter, the controller 180 can give a predetermined or automatically generated file name to the combined contents. Otherwise, as shown in FIG. 8D, the controller 180 can display an input window 867 for receiving a file name input by a user. For example, when a slide show file is generated with a plurality of images, the controller 180 can give a file name in the form of "slide show #."

Figure 9A:
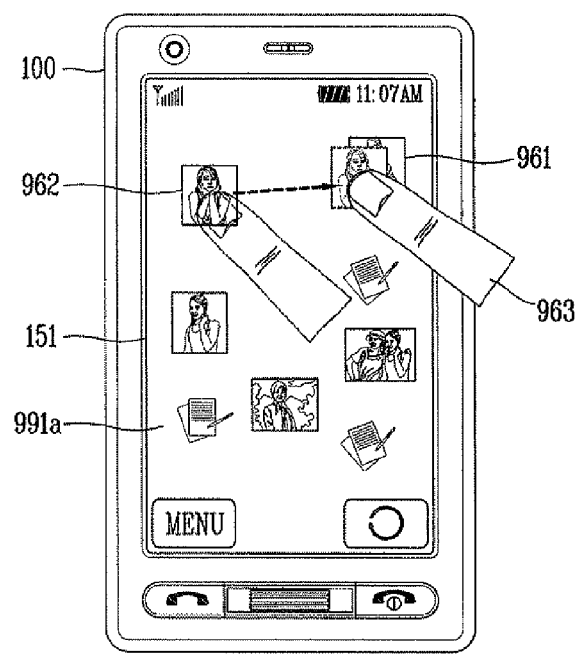
FIGS. 9A and 9B are overviews of display screens illustrating an arrangement of images according to a drag order in the mobile terminal in accordance with one embodiment of the present invention.
Figure 9B:
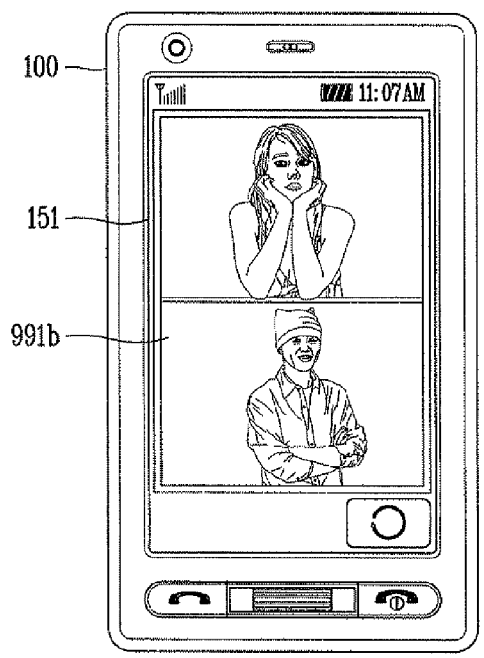

FIGS. 9A and 9B are overviews of display screens illustrating an arrangement of images according to a drag order in the mobile terminal 100 in accordance with one embodiment of the present invention.

As shown in FIG. 9A, when the pointer 963 contacts a first icon, such as icon 962, among icons displayed in the display screen 991*a* on the display unit 151 and is moved to a second icon, such as icon 961, while maintaining the contact, the controller 180 detects the movement of the pointer 963 via the sensing unit 140 and moves the first icon so as to overlap with the second icon. At this time, the controller 180 copies the first icon in a state that the first icon is positioned at its original position, and displays movement of the first icon according to movement of the pointer 963. When the pointer 963 releases the contact, the controller 180 no longer displays the copy of the first icon.

Once the pointer 963 releases the contact, the controller 180 combines the contents corresponding to the first and second icons and displays them as a preview, as shown in FIG. 9B. Here, the controller 180 determines arrangement of the contents according to the order (also herein referred to as a "drag order") in which the first and second icons are dragged. For example, when the first icon is dragged to overlap with the second icon, the controller 180 positions a first image corresponding to the first icon above a second image corresponding to the second icon and generates a single image as shown in FIG. 9B. The controller 180 can then display the generated image as a preview screen 991*b* on the display unit 151.

Figure 10A:
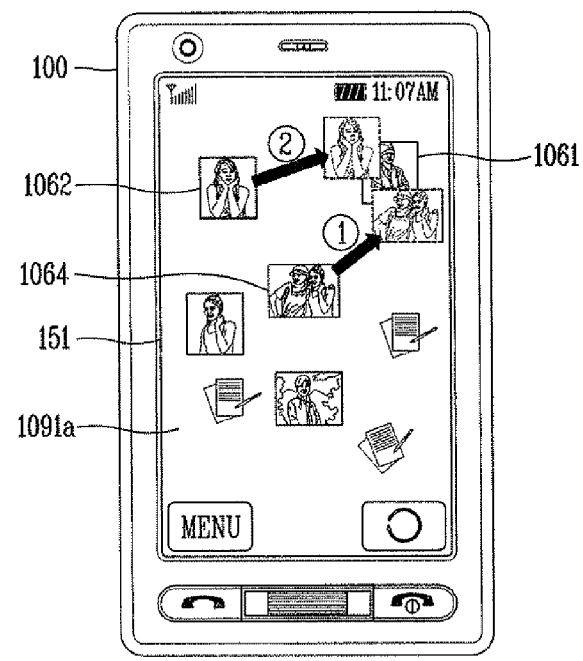
FIGS. 10A and 10B are overviews of display screens illustrating an arrangement of images according to a drag order in the mobile terminal in accordance with one embodiment of the present invention.
Figure 10B:
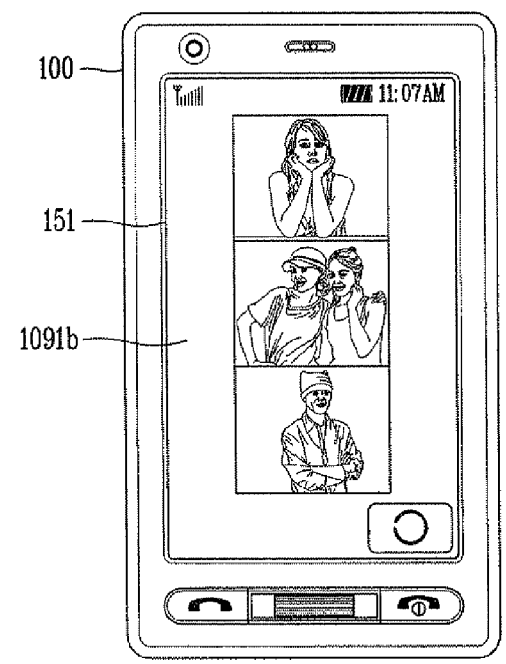

FIGS. 10A and 10B are overviews of display screens illustrating an arrangement of images according to a drag order in the mobile terminal 100 in accordance with one embodiment of the present invention.

In the embodiment of FIG. 10A, three different contents represented by three separate icons can be combined by moving two of the icons onto the remaining icon via a touch-and-drag operation. For example, as shown in FIG. 10A, the icon 1064 in screen 991*a* can be moved first onto the icon 1061 and the icon 1062 can be moved second onto the icon 1071. The controller 180 can recognize the three contents corresponding to the three icons as the contents to be combined.

The controller 180 then determines an arrangement of the contents to be combined according to the drag order of the icons 1064 and 1062. For example, when the icons 1064 and 1062 are sequentially moved onto the icon 1071 via the touch-and-drag operation, the controller 180 arranges the images corresponding to the icons 1064 and 1062 above the image corresponding to the icon 1071 in the order in which they are moved, as shown in screen 1091*b* of FIG. 10B.

Figure 11A:
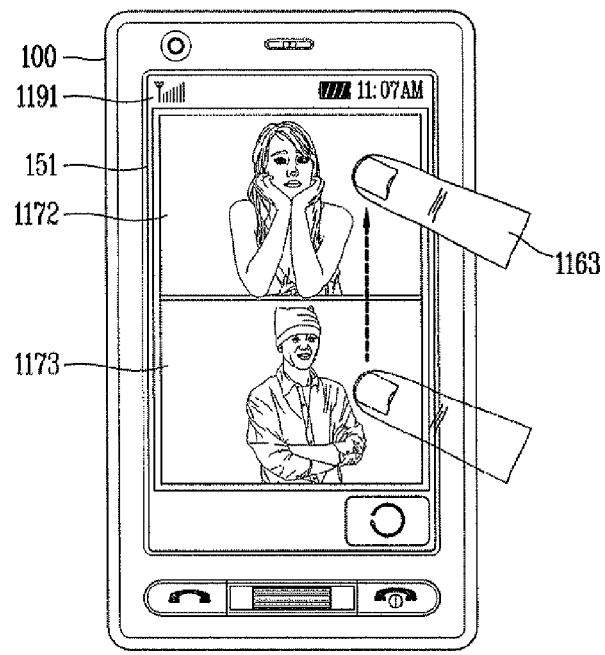
FIGS. 11A and 11B are overviews of display screens illustrating a changing of an arrangement of contents in a preview screen of the mobile terminal in accordance with one embodiment of the present invention.
Figure 11B:
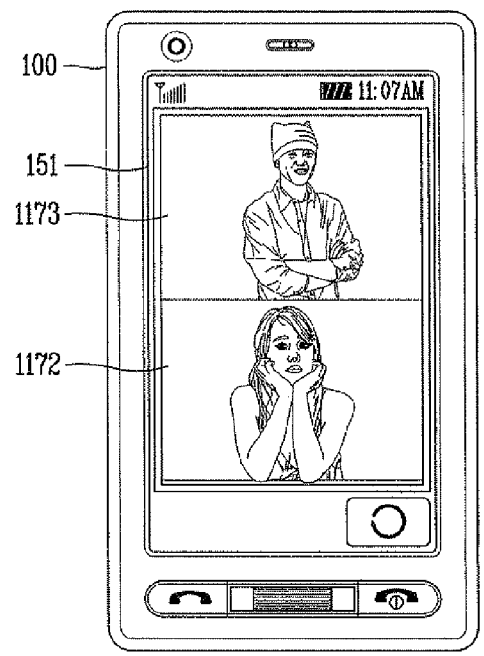

FIGS. 11A and 11B are overviews of display screens illustrating a changing of an arrangement of contents in a preview screen of the mobile terminal 100 in accordance with one embodiment of the present invention.

As shown in FIG. 11A, when the user desires to change the arrangement of two combined images, such as the first and second images 1172 and 1173, displayed on a preview screen 1191 in the display unit 151, the user can move either of the two images to a desired position via a touch-and-drag operation. For example, in the portrait arrangement of the first and second images 1172 and 1173 in FIG. 11A, when the user desires to move the second image 1173 to the region of the first image 1172, the controller 180 moves the second image 1173 to the region where the first image 1172 is positioned according to a touch-and-drag operation performed by the user. Then, the controller 180 interchanges and displays the positions of the first and second images 1172 and 1173. For example, as shown in FIG. 11B, the first image 1172 is moved to the lower portion of the screen and the second image 1173 is moved to the upper portion of the screen.

Figure 12A:
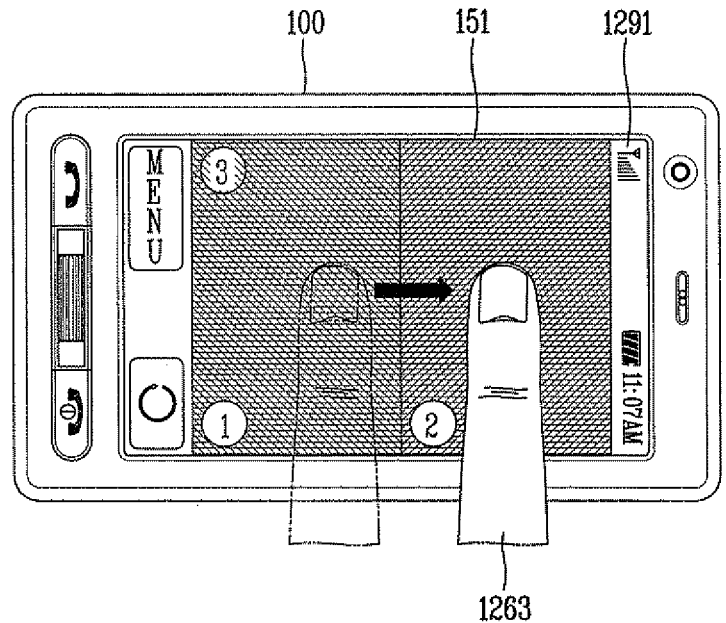
FIGS. 12A and 12B are overviews of display screens illustrating a changing of an arrangement of contents in a preview screen of the mobile terminal in accordance with one embodiment of the present invention.
Figure 12B:
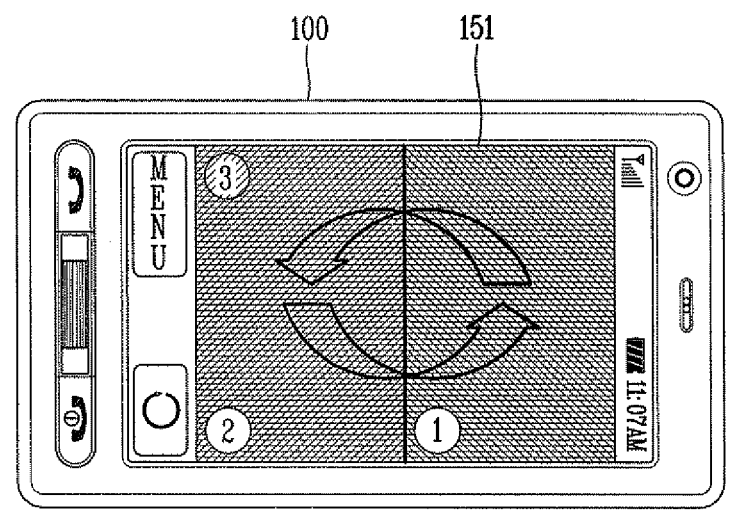

FIGS. 12A and 12B are overviews of display screens illustrating a changing of an arrangement of contents in a preview screen of the mobile terminal 100 in accordance with one embodiment of the present invention.

As shown in FIG. 12A, the controller 180 can display a combined image including a first image "1" and a second image "2" arranged in a landscape configuration and overlapping a third image "3," which is an overall background image, in a preview screen 1291 on the display unit 151. When the first image "1" of the combined image is moved from left to right via a touch-and-drag operation using the pointer 1263, the controller 180 changes the positions of the first image "1" and the second image "2." For example, and as shown in FIG. 12B, the first image "1" is moved from the left side of the display unit 151 to right side and the second image "2" is moved from right of the display unit 151 to the left side.

Figure 13A:
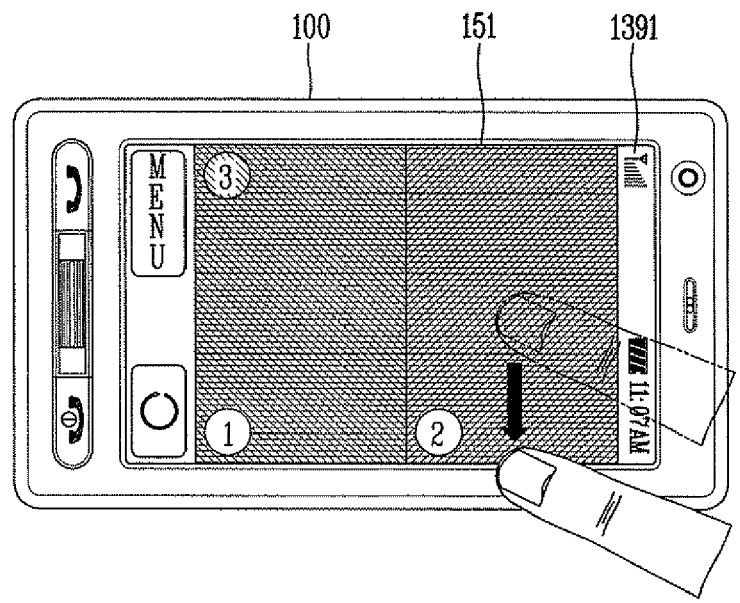
FIGS. 13A and 13B are overviews of display screens illustrating a changing of an arrangement of contents in a preview screen of the mobile terminal in accordance with one embodiment of the present invention.
Figure 13B:
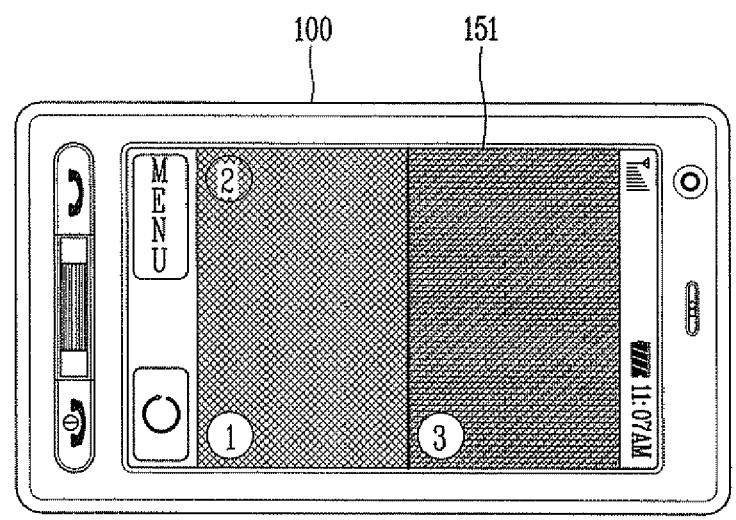

FIGS. 13A and 13B are overviews of display screens illustrating a changing of an arrangement of contents in a preview screen of the mobile terminal 100 in accordance with one embodiment of the present invention.

As shown in FIG. 13A, the controller 180 can display a combined image including a first image "1" and a second image "2" arranged in a landscape configuration and overlapping a third image "3," which is an overall background image, in a preview screen 1391 on the display unit 151. As also shown in FIG. 13A, the background can be changed to the second image "2" by performing a touch-and-drag operation in a downward direction on the second image "2." The controller 180 then exchanges the positions of the second image "2" and the third image "3" and displays the first image "1," the second image "2," and the third image "3" as shown in FIG. 13B.

FIGS. 14A through 14D is an overview of display screens illustrating a technique for combining images of faces in the mobile terminal 100 in accordance with one embodiment of the present invention.

Figure 14A:
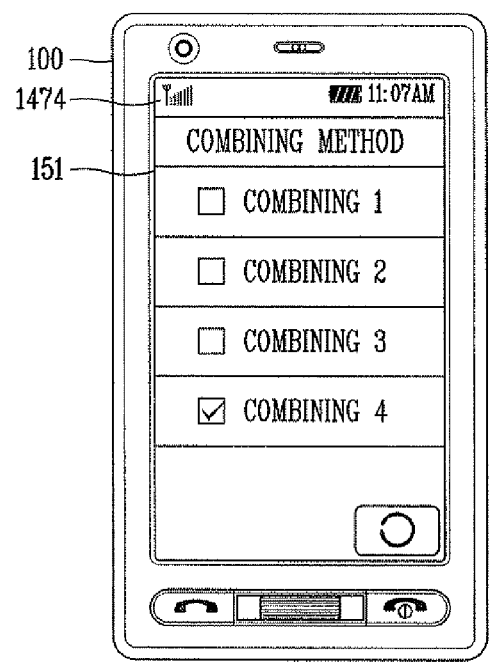
FIGS. 14A through 14D is an overview of display screens illustrating a technique for combining images of faces in the mobile terminal in accordance with one embodiment of the present invention.
Figure 14B:
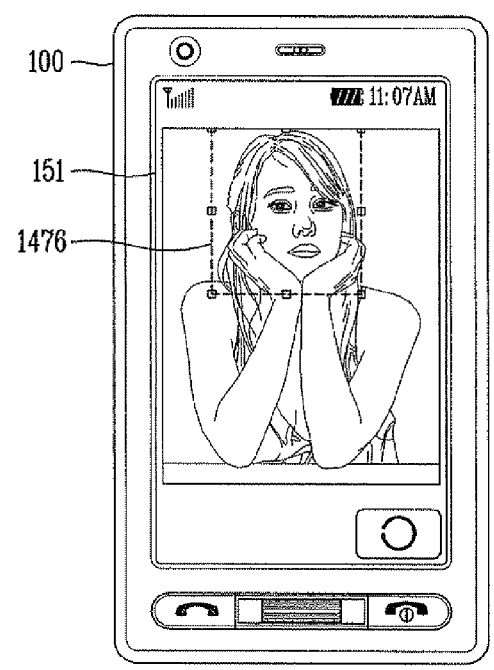
Figure 14C:
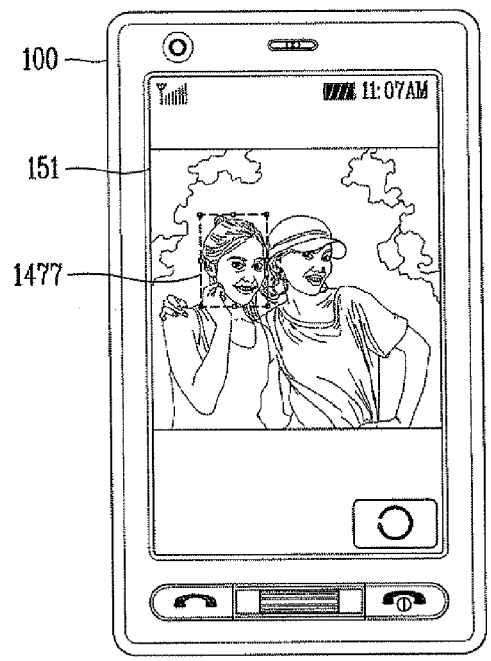

In one embodiment, as shown in FIG. 14A, the controller 180 displays a settings screen 1474 for selecting a combining method on the display unit 151 in response to a selection of images, via a touch-and-drag operation for example, which are to be combined. For example, when one of the icons representing an image to be combined is moved to overlap with another icon using a touch-and-drag operation, the controller 180 displays a settings screen 1474 for selecting a combining method on the display unit 151.

As shown in FIG. 14A, various combining methods are displayed in the setting screen 1474. For example, the "COM- BINING 4" method can be configured to combine images of faces. Thus, when the "COMBINING 4" method displayed on the display unit 151 is selected, the controller 180 can extract face regions from the selected two images. Here, the controller 180 may extract face regions, such as face region 1476 in FIG. 14B and face region 1477 in FIG. 14C, from the two images according to an algorithm or according to a selection by the user of the face regions in the selected images.

Figure 14D:
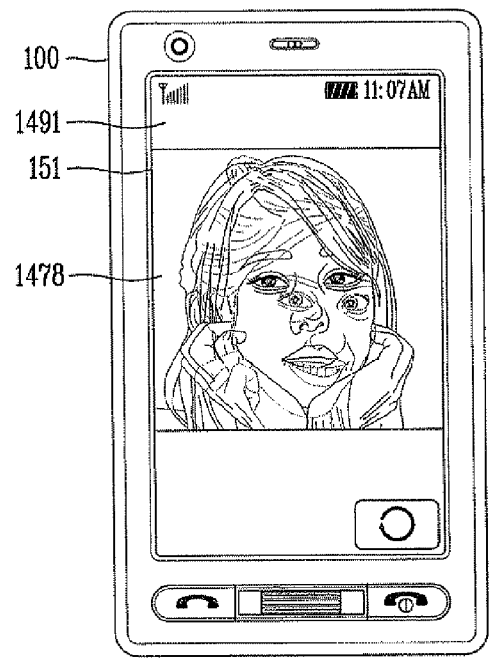

As shown in FIG. 14D, when the face regions 1476 and 1477 are extracted from the selected images, the controller 180 combines the extracted face regions to generate a new combined image 1478. The controller 180 then displays the new combined image 1478 as a preview on the screen 1491.

Figure 15A:
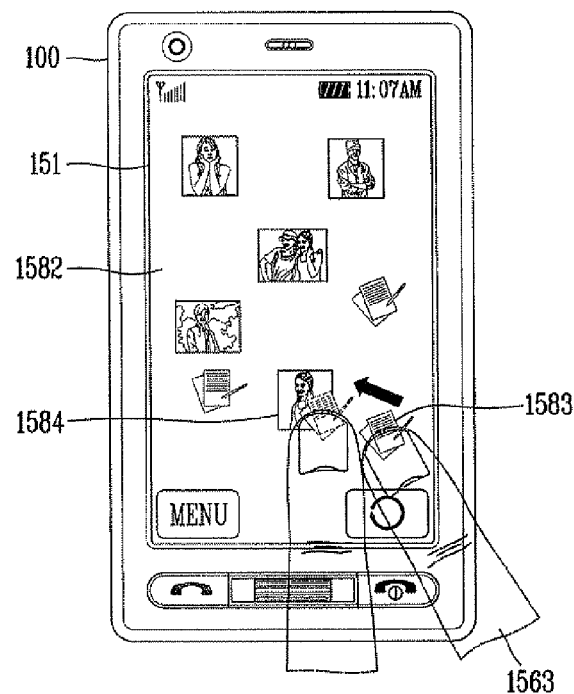
FIGS. 15A and 15B are overviews of display screens illustrating techniques for selecting and combining contents in the mobile terminal in accordance with one embodiment of the present invention.
Figure 15B:
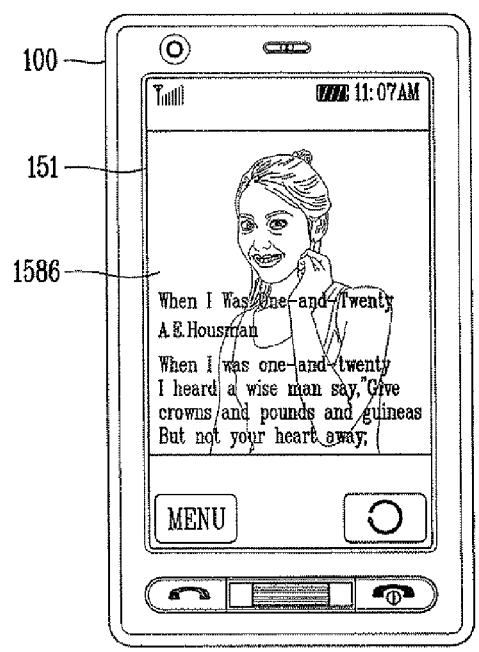

FIGS. 15A and 15B are overviews of display screens illustrating techniques for selecting and combining contents in the mobile terminal 100 in accordance with one embodiment of the present invention.

As shown in FIG. 15A, a user can use the pointer 1563 to perform a touch-and-drag operation on a document icon 1583 displayed in a display screen 1582. As also shown in FIG. 15A, the document icon 1583 can be moved via the touch-and-drag operation to overlap the image icon 1584 to be combined with the document icon 1583. The controller 180 can be configured to detect the overlapping of the document icon 1583 and the image icon 1584 via the sensing unit 140.

The controller 180 recognizes the overlapping of the document icon 1583 and the image icon 1584 as a command for combining contents and changes a current operation mode to an operation mode for selecting a method of combining contents.

For example, the controller 180 can display a selecting screen for selecting a combining method on the display unit 151, thereby allowing the user to select one of displayed combining methods. Alternatively, when the user wobbles the mobile terminal 100, the sensing unit 140 can detect a wobbling time and strength, and can transmit a corresponding signal to the controller 180. The controller 180 can randomly select a combining method based on the wobbling time and strength of the mobile terminal 100.

Once a combining method for the document icon 1583 and the image icon 1584 is selected, the controller 180 combines the document corresponding to the document icon 1583 and the image corresponding to the image icon 1584 according to the selected combining method to generate a new image 1586 shown in FIG. 15B. The new image can be stored, for example, in the memory 160.

In this embodiment, the case where the text of a document and an image are combined to generate a new image is provided as an example, but it is also possible to vary the methods for displaying text on an image to generate combined contents in the form of a video. Alternatively, music content can be combined as background music with the image and text-combined contents.

Figure 16:
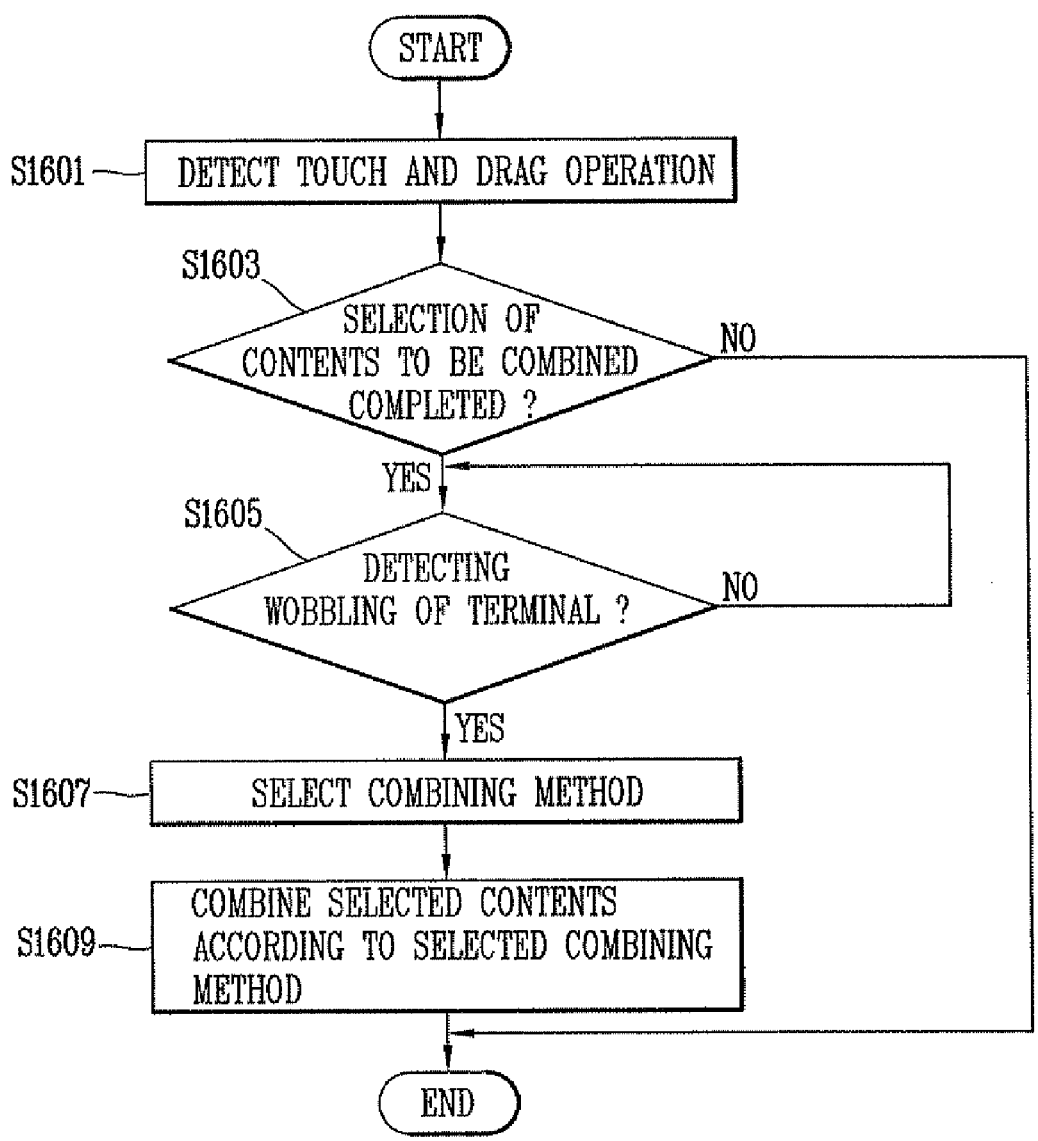
FIG. 16 is a flow chart illustrating a method for combining contents in the mobile terminal in accordance with one embodiment of the present invention.

FIG. 16 is a flow chart illustrating a method for combining contents in the mobile terminal 100 in accordance with one embodiment of the present invention.

As shown in FIG. 16, a touch-and-drag operation performed on the display screen in the display unit 151 displaying stored contents list as icons is detected by the sensing unit 140 (S1601). For example. when an icon corresponding to a content to be combined is moved to overlap with another icon corresponding to another content be using a touch-and-drag operation, the controller 180 receives the contents corresponding to the overlapping icons as the contents to be combined.

Once selection of the contents to be combined using the touch-and-drag operation is completed, the sensing unit 140 detects wobbling of the terminal (S1603, S1605). Here, the sensing unit 140 detects a wobbling time and strength of the mobile terminal 100 and transmits the wobbling time and strength to the controller 180. The sensing unit 140 may detect wobbling of the mobile terminal 100 by using a tilt sensor or a gyro sensor.

When wobbling of the mobile terminal 100 is detected, the controller 180 selects a combining method based on the wobbling time and strength of the mobile terminal 100 (S1607). The controller 180 then combines the selected contents according to the selected combining method to generate new contents (S1609).

FIGS. 17A through 17D are overviews of display screens illustrating combining of contents in the mobile terminal 100 in accordance with the embodiment of the method in FIG. 16.

Figure 17A:
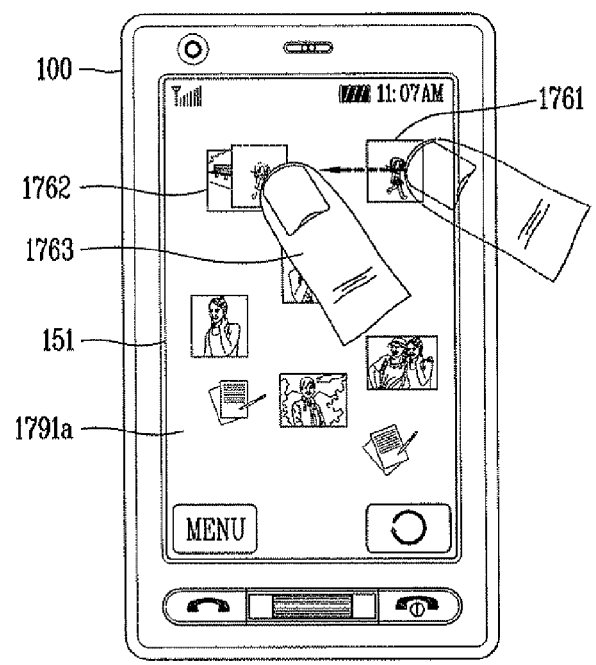
FIGS. 17A through 17D are overviews of display screens illustrating combining of contents in the mobile terminal in accordance with the embodiment of the method in FIG. 16.
Figure 17B:
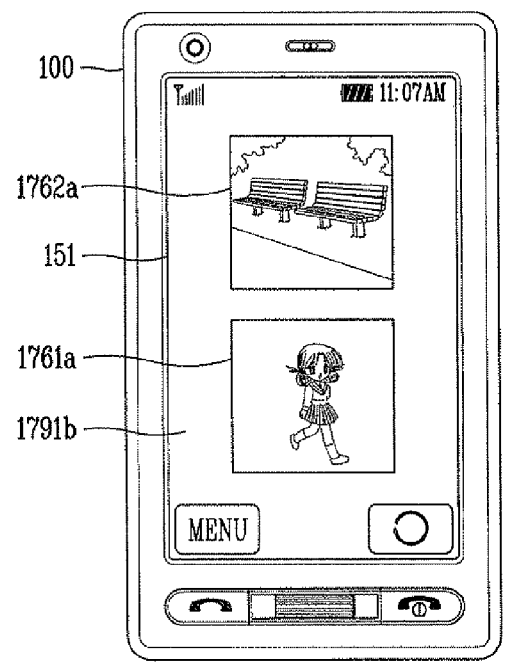
Figure 17C:
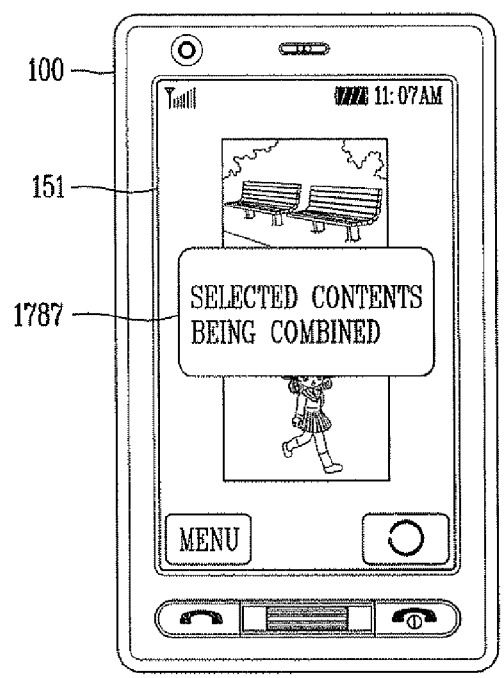
Figure 17D:
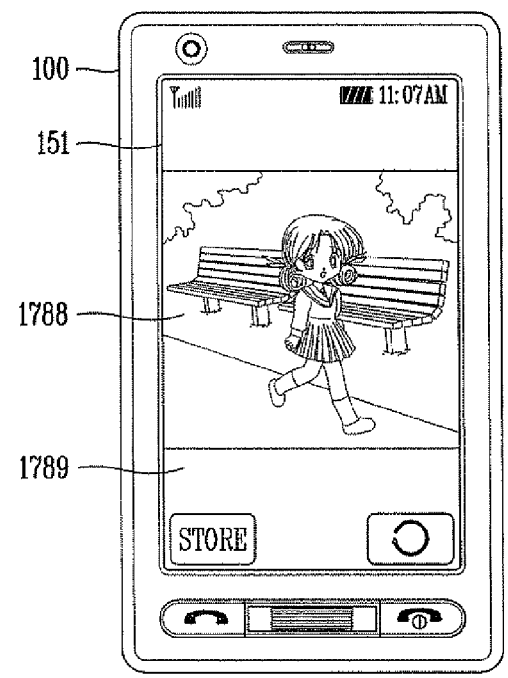

As shown in FIG. 17A, when a first icon 1761 in a display screen 1791a corresponding to a first image that is desired to be combined with a second image is moved using a touch-and-drag operation to overlap a second icon 1762 corresponding to the second image, the controller 180 displays the first and second images in the display unit 151. For example, the controller 180 displays contents selected to be combined on the display screen, such as the images 1761a and 1762a in the display screen 1791b shown in FIG. 17B.

Thereafter, when the mobile terminal 100 is wobbled by the user, the sensing unit 140 detects a wobbling time and strength and transmits the wobbling time and strength to the controller 180. When wobbling of the mobile terminal 100 is stopped, the controller 180 selects a combining method based on the detected wobbling time and strength.

When the combining method is selected, the controller 180 combines the first and second images 1761a and 1762a according to the selected combining method to generate a new combined image. At this time, the controller 180 can display a notification message 1787 indicating that the selected images are being combined in a pop-up window in the display screen on the display unit 151.

When the controller 180 has completed the combing of the selected images, the controller 180 can display the new combined image 1788 as a preview on the display screen 1789. In addition, the controller 180 can store the new combined image 1788 in the memory 160, generate an icon corresponding to the new combined image 1788, and display the icon on a display screen.

Figure 18:
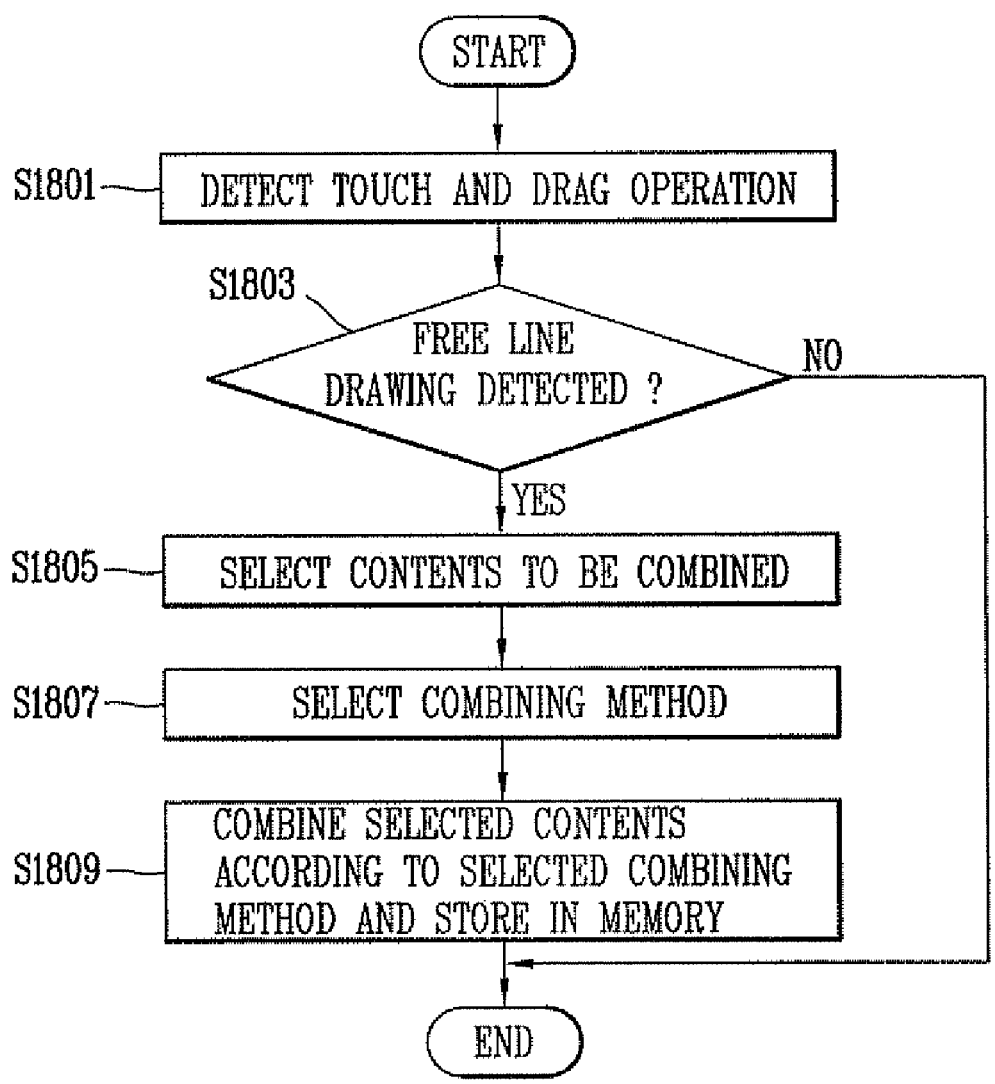
FIG. 18 is a flow chart illustrating a method for combining contents in the mobile terminal in accordance with one embodiment of the present invention.

FIG. 18 is a flow chart illustrating a method for combining contents in the mobile terminal 100 in accordance with one embodiment of the present invention.

As shown in FIG. 18, the sensing unit 140 detects a touch-and-drag operation applied to a certain region of the display screen (S1801). For example, when a pointer is moved using a touch-and-drag operation, the sensing unit 140 senses position information along points of a touch-and-drag path and sends such information to the controller 180.

If the input through the touch-and-drag operation corresponds to a free line, the controller 180 selects the icons positioned within the free line drawn using the touch-and-drag operation (S1803, S1805). For example, the controller 180 receives contents corresponding to the icons positioned within the free line as contents to be combined. Accordingly, the user can select the contents to be combined by selecting the region where the icons of the contents desired to be combined are positioned using a touch-and-drag operation.

When the contents to be combined are selected, the controller 180 selects, that is, determines, a combining method according to a user input (S1807). For example, when selecting of the contents is completed, the controller 180 displays a settings screen for selecting a combining method on the display unit 151 and selectively receives one of combining methods displayed on the display unit 151. Once the combining method is selected, the controller 180 combines the selected contents according to the selected combining method to generate new contents (S1809).

In this embodiment, the case where the combining method is selected according to a menu manipulation is taken as an example, but as described above, wobbling of the terminal may be detected and a combining method may be randomly selected based on the wobbling time and strength.

FIGS. 19A through 19D are overviews of display screens illustrating techniques for selecting and combining contents in the mobile terminal 100 in accordance with the embodiment of FIG. 18.

Figure 19A:
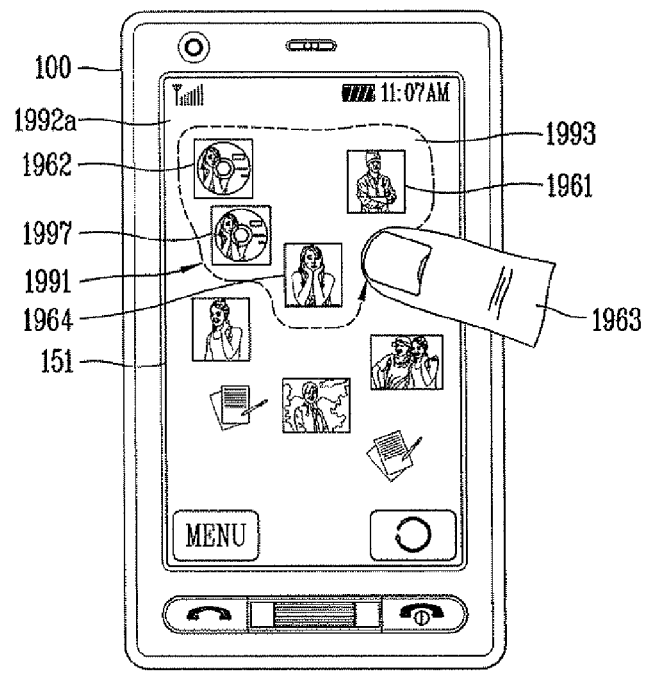
FIGS. 19A through 19D are overviews of display screens illustrating techniques for selecting and combining contents in the mobile terminal in accordance with the embodiment of FIG. 18.

As shown in FIG. 19A, when the pointer 1963 is used to draw a free line 1991 using a touch-and-drag operation on the display screen 1992a displaying two or more icons, the controller 180 detects the touch-and-drag operation via the sensing unit 140. The controller 180 then recognizes contents corresponding to the icons positioned within a region 1993 defined by the draw line 1991, such as icons 1961, 1962, 1964, and 1997, as contents to be combined.

Figure 19B:
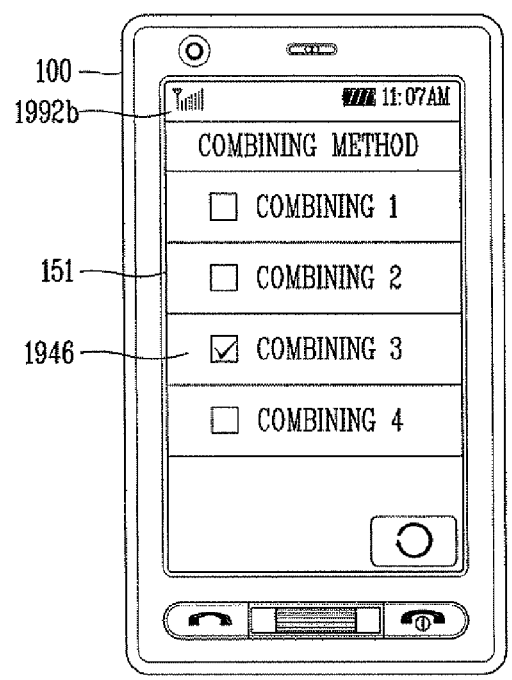

When selecting of the contents to be combined is completed, the controller 180 displays a settings screen 1992b on the display unit 151 for selecting a combining method as shown in FIG. 19B. When one of combining methods is selected, the controller 180 combines the selected contents according to the selected combining method to generate new combined contents.

For example, when the free line 1991 is drawn using a touch-and-drag operation as shown in FIG. 19A, the sensing unit 140 detects the touch-and-drag operation. The controller 180 recognizes four images corresponding to the four icons 1961, 1962, 1964, and 1997 positioned within the region 1993 defined by the free line 1991 as contents to be combined.

Figure 19C:
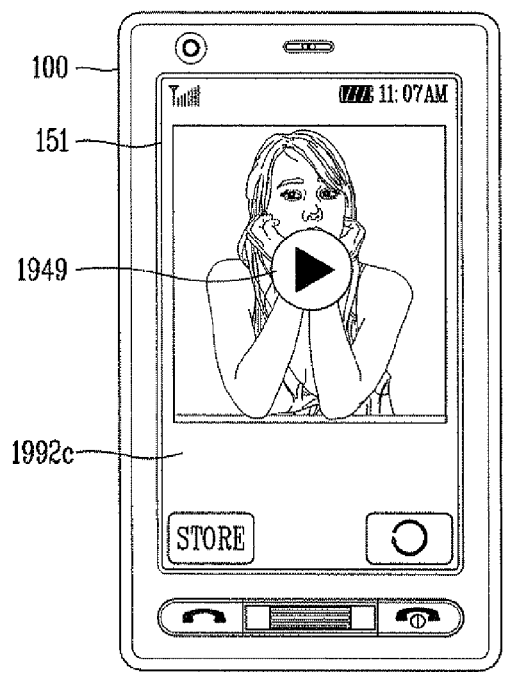

After selection of the contents to be combined is completed, if the "COMBINING 3" method corresponding to a slide show combining method is selected as shown in FIG. 19B, the controller 180 combines the four images corresponding to the icons 1961, 1962, 1964, and 1997 to generate a slide show file. In addition, as shown in FIG. 19C, the controller 180 displays the generated slide show file as a preview screen 1992c on the display unit 151.

When a reproduction command, such as the play button 1949, is inputted on the preview screen 1992c, the controller 180 reproduces a slide show, the generated combined contents, and displays the same.

Figure 19D:
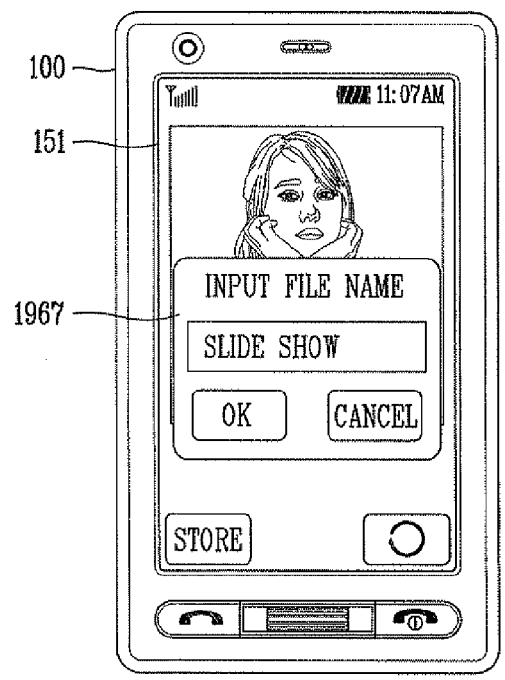

Thereafter, when a "store" command is received by the controller 180, the controller 180 stores the combined contents in the memory 160. For example, a "store" command can be received via the store button 1968 shown in FIG. 19C. Thereafter, the controller 180 can give a predetermined or automatically generated file name to the combined contents. Otherwise, as shown in FIG. 19D, the controller 180 can display an input window 1967 for receiving a file name input by a user.

FIGS. 20A through 20D are overviews of display screens illustrating techniques for selecting and combining contents in the mobile terminal 100 in accordance with the embodiment of FIG. 18.

Figure 20A:
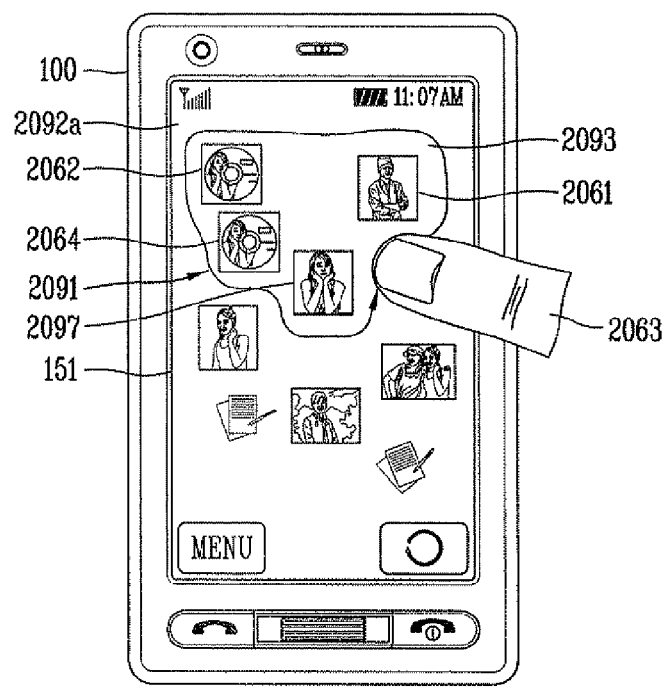
FIGS. 20A through 20D are overviews of display screens illustrating techniques for selecting and combining contents in the mobile terminal in accordance with the embodiment of FIG. 18.

As shown in FIG. 20A, when the pointer 2063 is used to draw a free line 2091 using a touch-and-drag operation on the display screen 2092a displaying two or more icons, the sensing unit 140 detects the touch-and-drag operation and informs the controller 180 about a touch point and movement path of the pointer 2063. The controller 180 then recognizes contents corresponding to the icons positioned within a region 2093 defined by the draw line 2091, such as icons 2061, 2062, 2064, and 2097, as contents to be combined.

Figure 20B:
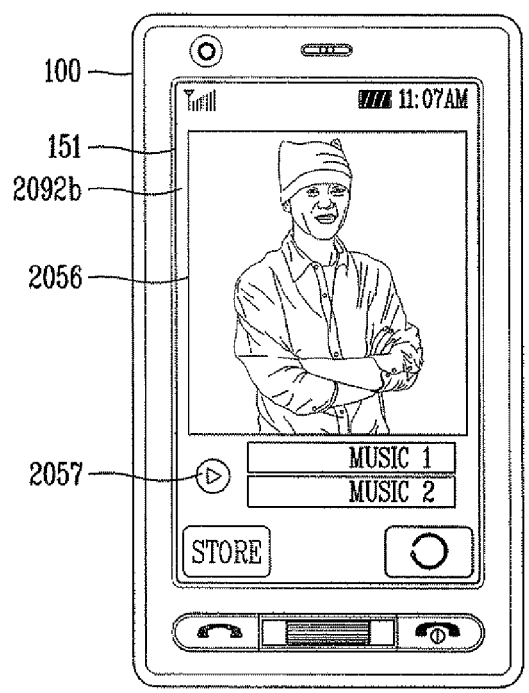

As shown in FIG. 20B, the controller 180 combines the contents corresponding to icons 2061, 2062, 2064, and 2097, positioned within the region 2093 selected in a touch-and-drag manner according to a default combining method. Alternatively, the controller 180 can provide a user interface for selecting a contents combining method. When a combining method is selected via the user interface, the controller 180 combines the contents according to the selected combining method to generate new contents and stores the generated new contents in the memory 160.

As shown in FIG. 20B, the controller 180 can display the combined contents as a preview image 2056 in the display screen 2092b. When a reproduction command is input on the preview image, for example via play button 2057, the controller 180 reproduces the combined contents, as shown in display screen 2092c in FIG. 20C.

A reproduction order of music may be changed on the preview screen 2092c. Namely, a music reproduction status bar 2058 may be moved in a touch-and-drag manner to change the reproduction order of "MUSIC 1" and "MUSIC 2."

Figure 20C:
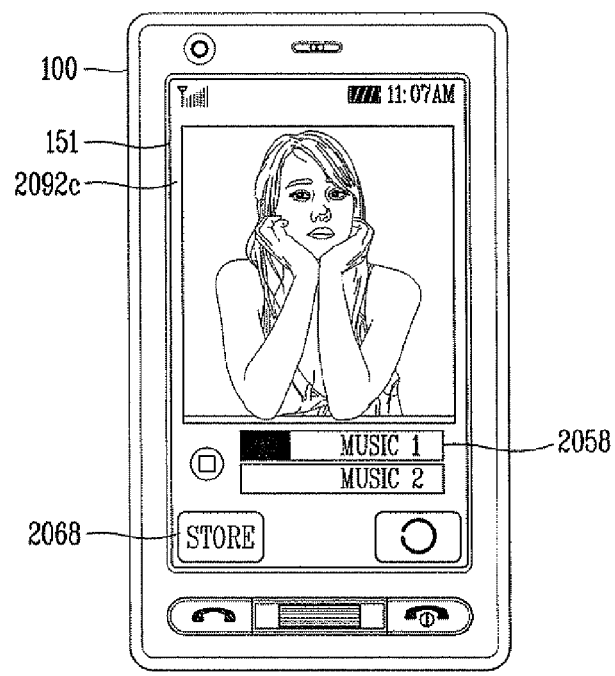
Figure 20D:
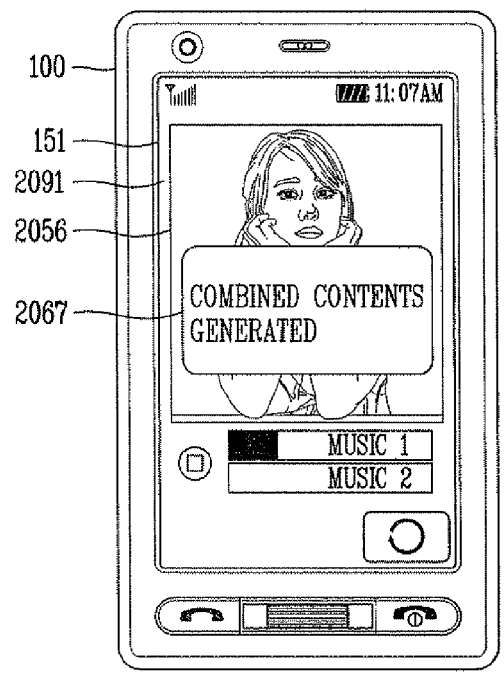

Thereafter, a "store" command can be received via the store button 2068 shown in FIG. 20C. The controller 180 can then store the combined contents and may display a message indicating generated combined contents, such as "COMBINED CONTENTS GENERATED" in a pop-up window 2067 as shown in FIG. 20D.

FIGS. 21A through 21D are overviews of display screens illustrating techniques for selecting and combining contents in the mobile terminal 100 in accordance with the embodiment of FIG. 18.

Figure 21A:
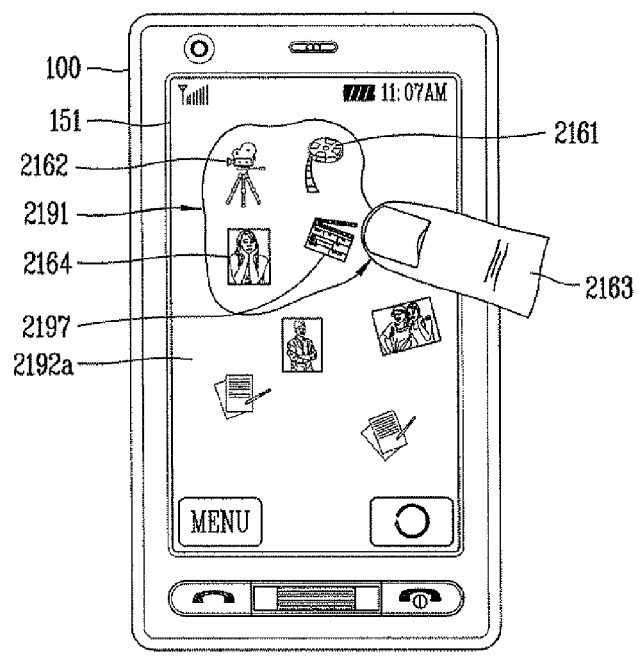
FIGS. 21A through 21D are overviews of display screens illustrating techniques for selecting and combining contents in the mobile terminal in accordance with the embodiment of FIG. 18.

As shown in FIG. 21A, three icons 2161, 2162, and 2197 corresponding to videos and one icon 2164 corresponding to an image are selected in a touch-and-drag manner by a pointer 2163 among the icons displayed on the display screen 2192a. Here, the sensing unit 140 detects the touch-and-drag operation of the pointer 2163 and transmits information about a movement path of the pointer 2163 to the controller 180. The controller 180 recognizes contents corresponding to icons positioned within the region 2193 defined by the free line 2191 drawn in a touch-and-drag manner as contents to be combined via the sensing unit 140.

When selection of the icons corresponding to the contents to be combined is completed, the controller 180 combines the selected contents and displays them on a preview screen 2192b. For example, when the selected three videos and one image are combined, the controller 180 inserts the image in front of each video according to a pre-set combining method and displays alignment of each of the contents selected from the combined contents on the preview screen 2192b. Here, when the aligned contents are desired to be changed, the order of the contents can be changed by changing the position of the contents via a touch-and-drag operation.

Figure 21B:
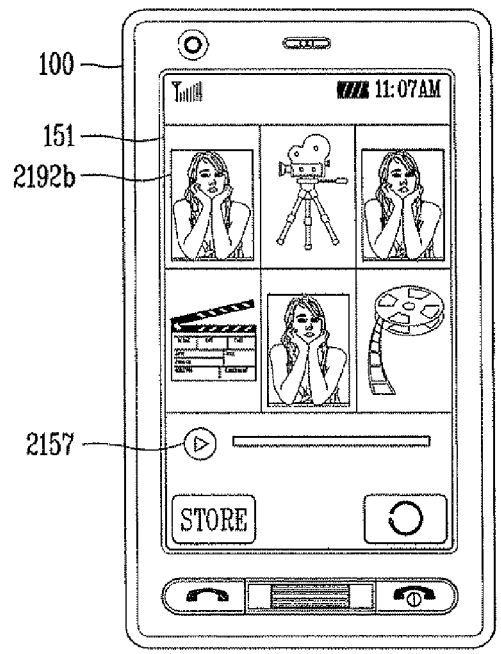
Figure 21C:
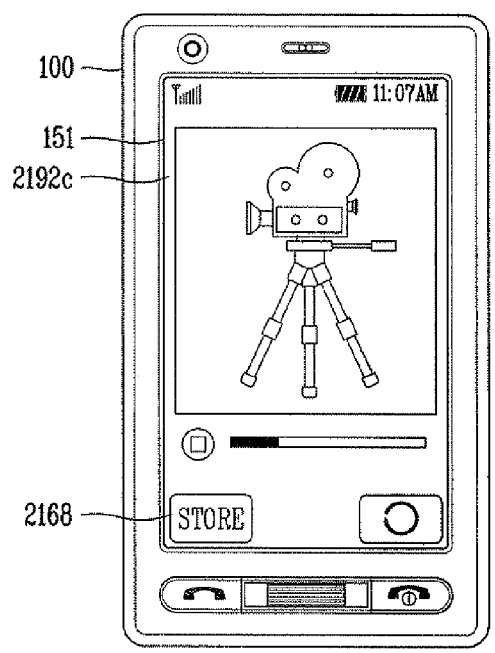
Figure 21D:
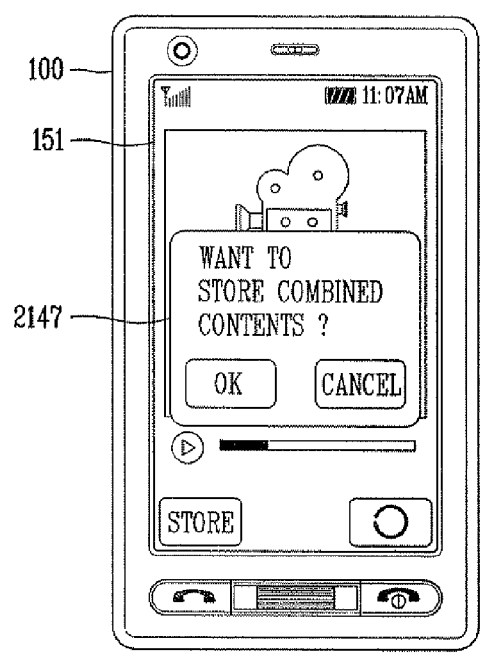

When a reproduction command is input via a "play" button 2157 on the preview screen 2192b shown in FIG. 21B, the controller 180 reproduces the combined contents as shown in the display screen 2192c in FIG. 21C. After the combined contents are reproduced, when a storage command is input via a "store" button 2168 shown in FIG. 21C, the controller 180 displays a pop-up window 2147 inquiring whether to store the combined contents as shown in FIG. 21D and stores the combined contents in the memory 160 according to a response provided by the user.

In this embodiment, icons are selected in a touch-and-drag manner and moved to overlap with another icon, but it can be also implemented such that the pointer displayed on the screen is controlled by manipulating a direction key to select a desired icon and move the icon to overlap with a portion of a different icon to thus perform contents combining.

In the embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

The mobile terminal according to the embodiments of the present invention is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a memory configured to store separate contents;
   a display configured to display a plurality of icons that each correspond to one of the stored separate contents;
   an input unit configured to sense at least a first user touch input on the display, the sensed first user touch input causing at least two of the plurality of displayed icons to at least partially overlap; and
   a controller configured to:
      control the display to display a combining method selection screen image that provides a plurality of selectable methods for combining the at least partially overlapped at least two of the plurality of displayed icons in response to the first user touch input;
      determine a selection of at least one of the plurality of selectable methods;
      combine the stored separate contents corresponding to the at least partially overlapped at least two of the plurality of displayed icons according to the determined selection of at least one of the plurality of selectable methods in order to generate new content;
      control the display to display a preview screen image corresponding to the generated new content;
      receive a second user touch input via the input unit to modify the generated new content;
      modify the generated new content in response to the received second user touch input; and
      control the display to display the modified new content.

2. The mobile terminal of claim 1, wherein at least the first or second user touch input is a contact touch-and-drag operation, a proximity touch-and-drag operation, or a key-drag operation.

3. The mobile terminal of claim 1, wherein each of the stored separate contents corresponding to the at least two of the plurality of displayed icons is an image, music, a photo, a video, a document, or a slide show.

4. The mobile terminal of claim 1, wherein the controller is further configured to:
   detect a wobbling of the mobile terminal after the at least two of the plurality of displayed icons have been overlapped; and
   determine the selection of the at least one of the plurality of selectable methods based on the detected wobbling.

5. A method for combining previously stored separate contents in a mobile terminal, the method comprising:
   displaying a plurality of icons that each correspond to one of the previously stored separate contents;
   sensing a first user touch input via an input unit for causing at least two of the plurality of displayed icons to be at least partially overlapped;
   selecting at least two of the plurality of displayed icons in response to the sensed first user touch input;
   displaying a combining method selection screen image providing a plurality of selectable methods for combining the at least partially overlapped at least two of the plurality of displayed icons;
   determining a selection of at least one of the plurality of selectable methods;
   combing the previously stored separate contents corresponding to the at least partially overlapped at least two of the plurality of displayed icons according to the selected at least one of the plurality of selectable methods in order to generate new content;
   displaying a preview screen image corresponding to the generated new content;
   receiving a second user touch input via the input unit to modify the generated new content;
   modifying the generated new content in response to the received second user touch input; and
   displaying the modified new content.

6. The method of claim 5, wherein at least the first or second user touch input is a contact touch-and-drag operation, a proximity touch-and-drag operation, or a key-drag operation.

7. The method of claim 5, wherein each of the previously stored separate contents corresponding to the at least two of the plurality of displayed icons is an image, music, a photo, a video, a document, or a slide show.

8. The method of claim 5, further comprising:
   detecting a wobbling of the mobile terminal after the at least two of the plurality of displayed icons have been overlapped; and
   determining the selection of the at least one of the plurality of selectable methods based on the detected wobbling.

9. A method for combining previously stored separate contents in a mobile terminal, the method comprising:
   displaying a plurality of icons that each represent one of the previously stored separate contents;
   sensing a first user touch input via an input unit;
   selecting at least two of the plurality of displayed icons in response to the sensed first user touch input;
   displaying a combining method selection screen image providing a plurality of selectable methods for combining the selected at least two of the plurality of displayed icons;
   determining a selection of at least one of the plurality of selectable methods;
   combining the previously stored contents corresponding to the selected at least two of the plurality of displayed icons according to the selected at least one of the plurality of selectable methods in order to generate new content;

displaying a preview screen image corresponding to the generated new content;

receiving a second user touch input via the input unit to modify the generated new content;

modifying the generated new content in response to the received second user touch input; and displaying the modified new content on the preview screen image.

10. The method of claim 9, wherein selecting the at least two of the plurality of displayed icons comprises:

moving a first displayed icon of the plurality of displayed icons towards a second displayed icon of the plurality of displayed icons via a touch-and-drag operation; and selecting the first and second displayed icons when the first displayed icon at least partially overlaps the second displayed icon upon completion of the touch-and-drag operation.

11. The method of claim 9, further comprising:

moving a first displayed icon of the plurality of displayed icons towards a second displayed icon via a touch-and-drag operation; and selecting the first icon when the first displayed icon at least partially overlaps the second displayed icon upon completion the touch-and-drag operation.

12. The method of claim 9, wherein:

combining the previously stored contents comprises combining at least one file comprising text with at least one file comprising an image in order to generate the new content; and the generated new content comprises the text and the image.

13. The method of claim 9, wherein combining the previously stored contents comprises combining an audio file and an image file.

14. The method of claim 9, further comprising:

detecting a wobbling of the mobile terminal after selecting the at least two of the plurality of displayed icons; and determining the selection of the at least one of the plurality of selectable methods based on the detected wobbling.

15. The method of claim 14, further comprising:

detecting a wobbling time and a wobbling strength of the mobile terminal; and determining the selection of the at least one of the plurality of methods based on the detected wobbling time and wobbling strength.

\* \* \* \* \*